US012711310B2

(12) United States Patent
Nishida et al.

(10) Patent No.: US 12,711,310 B2
(45) Date of Patent: Aug. 18, 2026

(54) LEARNING APPARATUS, TEXT GENERATION APPARATUS, LEARNING METHOD, TEXT GENERATION METHOD AND PROGRAM

(71) Applicant: NTT, Inc.

(72) Inventors: Kyosuke Nishida, Tokyo (JP); Ryota Tanaka, Tokyo (JP); Sen Yoshida, Tokyo (JP); Junji Tomita, Tokyo (JP)

(73) Assignee: NTT, Inc., Tokyo (JP)

( * ) Notice: Subject to any disclaimer, the term of this patent is extended or adjusted under 35 U.S.C. 154(b) by 63 days.

(21) Appl. No.: 17/799,616

(22) PCT Filed: Dec. 9, 2020

(86) PCT No.: PCT/JP2020/045910

§ 371 (c)(1),
(2) Date: Aug. 12, 2022

(87) PCT Pub. No.: WO2021/171732

PCT Pub. Date: Sep. 2, 2021

(65) Prior Publication Data

US 2023/0076576 A1 Mar. 9, 2023

(30) Foreign Application Priority Data

Feb. 28, 2020 (WO) .................. PCT/JP2020/008390

(51) Int. Cl.

*G06F 40/284* (2020.01)
*G06F 16/3329* (2025.01)
*G06N 3/08* (2023.01)

(52) U.S. Cl.

CPC ........ *G06F 40/284* (2020.01); *G06F 16/3329* (2019.01); *G06N 3/08* (2013.01)

(58) Field of Classification Search

CPC .... G06F 40/284; G06F 16/3329; G06F 40/35; G06N 3/08; G06N 3/0455; G06N 3/0464; G06N 3/048

See application file for complete search history.

(56) References Cited

U.S. PATENT DOCUMENTS 11,023,518 B2 * 6/2021 Jung .................. G06F 16/5838
11,250,039 B1 * 2/2022 Chang .................. G06F 40/30

(Continued)

FOREIGN PATENT DOCUMENTS

JP 2017091525 A 5/2017
JP 2017-534956 A 11/2017

OTHER PUBLICATIONS

Chen et al.,"Uniter: Learning Universal Image-Text Representations," arXiv preprint arXiv:1909.11740, pp. 1-13, 2019. (Year: 2019).*

(Continued)

*Primary Examiner* — Fariba Sirjani

(57) ABSTRACT

A learning device includes a memory; and a processor configured to execute answer generation means for taking data including text, and a question text related to the data as inputs; creating, by using a model parameter of a neural network, a token sequence that takes visual information in the data into consideration, and generating an answer text to the question text, based on the created token sequence; and learning means for learning the model parameter by using the answer text and a correct answer text to the question text.

20 Claims, 17 Drawing Sheets

(56) References Cited

U.S. PATENT DOCUMENTS

| | | | | |
|---|---|---|---|---|
| 11,487,999 | B2 * | 11/2022 | Le | G06N 3/0464 |
| 2003/0225763 | A1 * | 12/2003 | Guilak | G06F 16/353 |
| 2011/0153653 | A1 * | 6/2011 | King | G06F 16/5846 707/769 |
| 2016/0342895 | A1 * | 11/2016 | Gao | G06N 3/0464 |
| 2017/0061250 | A1 * | 3/2017 | Gao | G06V 20/35 |
| 2017/0124432 | A1 | 5/2017 | Chen et al. | |
| 2017/0351712 | A1 * | 12/2017 | Jung | G06F 16/29 |
| 2018/0336405 | A1 * | 11/2018 | Messina | G06V 10/764 |
| 2019/0325025 | A1 * | 10/2019 | Jung | G06N 3/042 |
| 2020/0293921 | A1 * | 9/2020 | Huang | G06V 30/274 |
| 2020/0394515 | A1 * | 12/2020 | Koike | G06V 10/255 |
| 2021/0150118 | A1 * | 5/2021 | Le | G06F 40/284 |
| 2021/0174162 | A1 * | 6/2021 | Le | G06V 20/46 |
| 2021/0209139 | A1 * | 7/2021 | Wu | G06N 3/044 |
| 2021/0232773 | A1 * | 7/2021 | Wang | G06F 40/284 |
| 2023/0076576 | A1 * | 3/2023 | Nishida | G06F 40/35 |

OTHER PUBLICATIONS

Nishida et al. (2019) “Multi-style Generative Reading Comprehension” ACL (1): pp. 2273-2284.

Ren et al. (2015) “Faster R-CNN: Towards Real-Time Object Detection with Region Proposal Networks” NIPS 2015: pp. 91-99.

Google (2018) “Tesseract Manual” [online] website: <URL: https://github.com/tesseract-ocr/tesseract/blob/master/doc/tesseract.1.asc>.

Radford et al. (2019) “Language models are unsupervised multitask learners” Technical report, OpenAI.

Devlin et al. (2019) “BERT: Pre-training of Deep Bidirectional Transformers for Language,” May 24, 2019.

Lewis et al. (2019) “BART: Denoising Sequence-to-Sequence Pre-training for Natural Language Generation, Translation, and Comprehension” arXiv.

Vaswani et al. (2017) “Attention is all you need” In Advances in neural information processing systems, pp. 5998-6008.

Ba et al. (2016) “Layer Normalization” arXiv.

Raffel et al. (2020) “Exploring the Limits of Transfer Learning with a Unified Text-to-Text Transformer” J. Mach. Learn. Res. 21(140): pp. 1-67.

Hu et al. (2020) “Iterative Answer Prediction with Pointer-Augmented Multi-modal Transformers for TextVQA” In CVPR, pp. 9992-10002.

Office Action issued in related application JP 2023-216105, Oct. 8, 2024, 7 pages.

* cited by examiner

Fig. 2

INPUT: IMAGE INCLUDING TEXT
INPUT: QUESTION TEXT
10
QUESTION ANSWERING DEVICE
101
FEATURE REGION EXTRACTION UNIT
102
TEXT RECOGNITION UNIT
107
LEARNED MODEL PARAMETERS
103
TEXT ANALYSIS UNIT
104
LANGUAGE-WITH-VISUAL-EFFECT UNDERSTANDING UNIT
105
ANSWER TEXT GENERATION UNIT
OUTPUT: ANSWER TEXT

Figure 10:
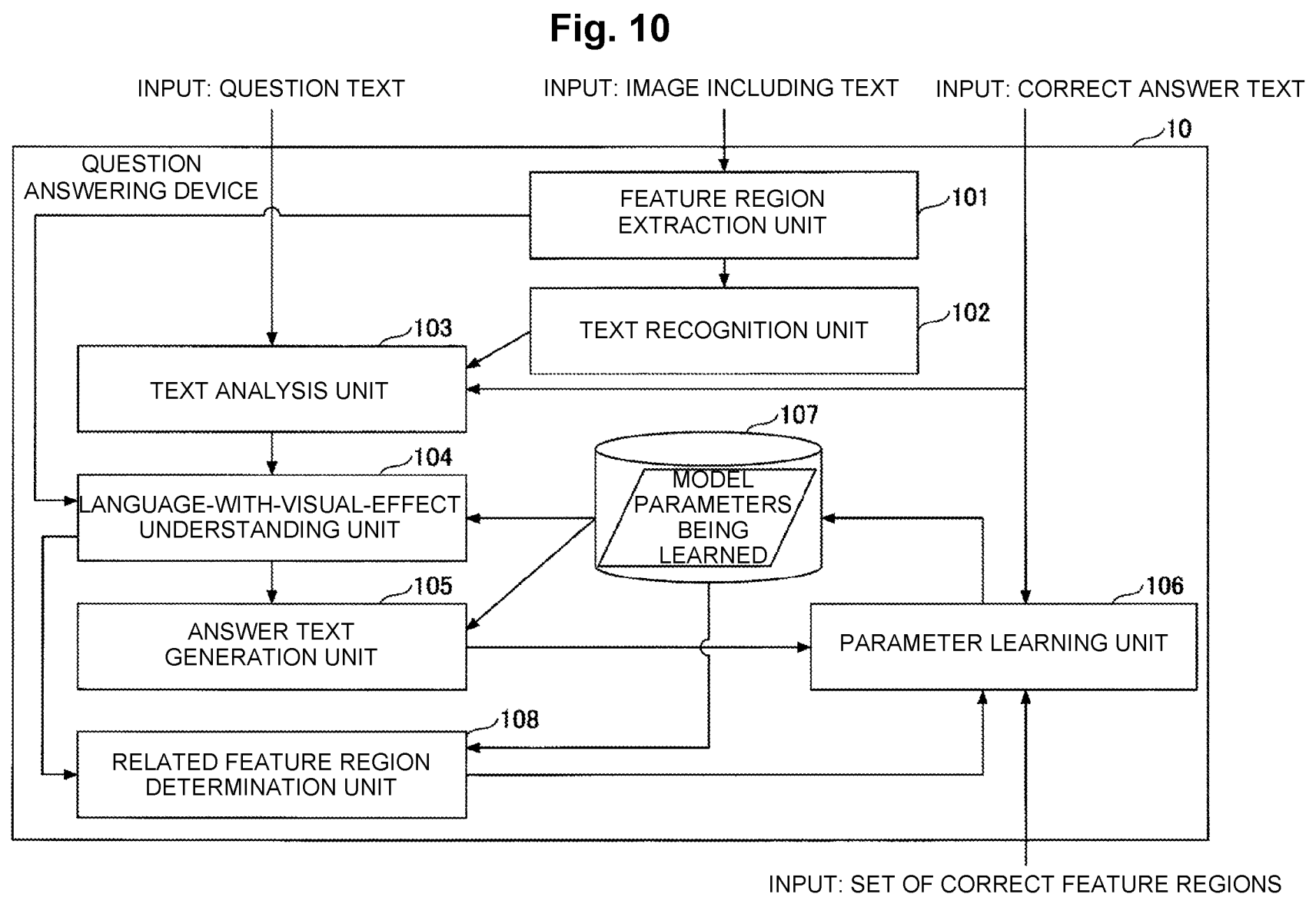

INPUT: QUESTION TEXT
INPUT: IMAGE INCLUDING TEXT
INPUT: CORRECT ANSWER TEXT
10
QUESTION ANSWERING DEVICE
101 FEATURE REGION EXTRACTION UNIT
102 TEXT RECOGNITION UNIT
103 TEXT ANALYSIS UNIT
104 LANGUAGE-WITH-VISUAL-EFFECT UNDERSTANDING UNIT
105 ANSWER TEXT GENERATION UNIT
106 PARAMETER LEARNING UNIT
107 MODEL PARAMETERS BEING LEARNED
108 RELATED FEATURE REGION DETERMINATION UNIT
INPUT: SET OF CORRECT FEATURE REGIONS

Fig. 14

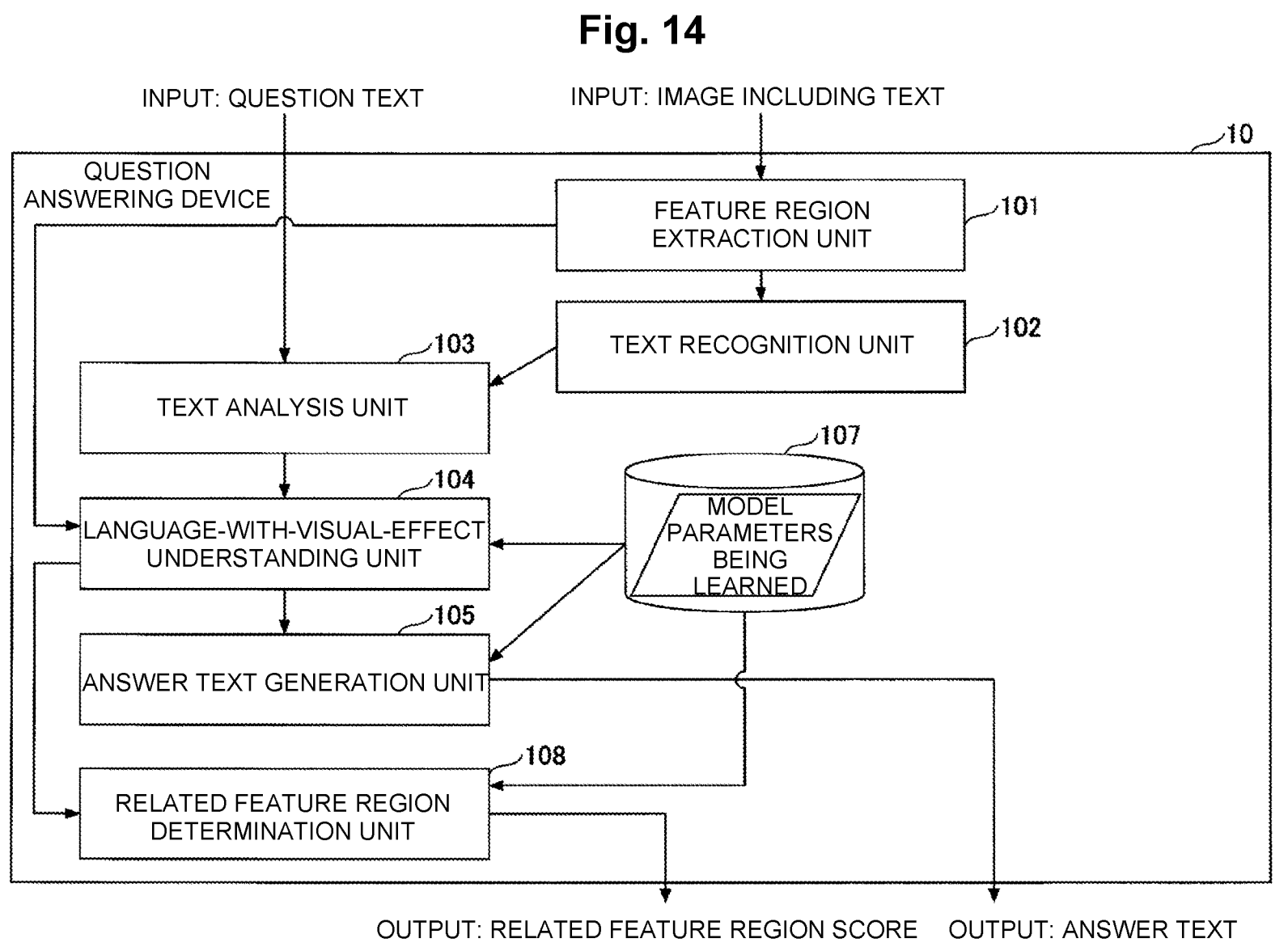

INPUT: IMAGE INCLUDING TEXT

INPUT: QUESTION TEXT

10

QUESTION ANSWERING DEVICE

101 FEATURE REGION EXTRACTION UNIT

102 TEXT RECOGNITION UNIT

103 TEXT ANALYSIS UNIT

104 LANGUAGE-WITH-VISUAL-EFFECT UNDERSTANDING UNIT

105 ANSWER TEXT GENERATION UNIT

107 MODEL PARAMETERS BEING LEARNED

108 RELATED FEATURE REGION DETERMINATION UNIT

OUTPUT: ANSWER TEXT

OUTPUT: RELATED FEATURE REGION SCORE

LEARNING APPARATUS, TEXT GENERATION APPARATUS, LEARNING METHOD, TEXT GENERATION METHOD AND PROGRAM

CROSS-REFERENCE TO RELATED APPLICATIONS

This application is a U.S. National Stage Application filed under 35 U.S.C. § 371 claiming priority to International Patent Application No. PCT/JP2020/045910, filed on 9 Dec. 2020, which application claims priority to and the benefit of JP Application No. PCT/JP2020/008390, filed on 28 Feb. 2020, the disclosures of which are hereby incorporated herein by reference in their entireties.

TECHNICAL FIELD

The present invention relates to a learning device, a text generation device, a learning method, a text generation method, and a program.

BACKGROUND ART

If "machine reading comprehension", in which an answer to a question is generated based on a given set of documents, can be accurately performed by artificial intelligence, such machine reading comprehension can be applied to a wide range of services such as question answering and intelligent agent conversation. Machine reading comprehension includes an extraction type and a generation type, and, for example, a technology disclosed in Non-Patent Literature 1 is known as a conventional technology for performing generation-based machine reading comprehension.

CITATION LIST

Non-Patent Literature

Non-Patent Literature 1: Kyosuke Nishida, Itsumi Saito, Kosuke Nishida, Kazutoshi Shinoda, Atsushi Otsuka, Hisako Asano, Junji Tomita: Multi-style Generative Reading Comprehension. ACL (1) 2019: 2273-2284

SUMMARY OF THE INVENTION

Technical Problem

However, conventional machine reading comprehension technologies handle only text, and are unable to handle visual information such as a location and a size of a text in a document. Accordingly, when a document in which a plurality of texts are laid out (for example, an HTML (HyperText Markup Language) document or a PDF (Portable Document Format) document) is understood through machine reading comprehension, information other than contents of the texts is treated as in a missing state.

An embodiment of the present invention has been made in the above-mentioned respect, and an object of the present invention is to achieve machine reading comprehension that takes visual information into consideration.

Means for Solving the Problem

To achieve the object, a learning device according to an embodiment includes: answer generation means for taking data including text, and a question text related to the data as inputs, creating, by using a model parameter of a neural network, a token sequence that takes visual information in the data into consideration, and generating an answer text to the question text, based on the created token sequence; and learning means for learning the model parameter by using the answer text and a correct answer text to the question text.

Effects of the Invention

Machine reading comprehension can be achieved that takes visual information into consideration.

BRIEF DESCRIPTION OF DRAWINGS

FIG. 2 is a flowchart showing an example of learning processing according to the first embodiment.

FIG. 8 is a flowchart showing an example of inference processing according to the first embodiment.

FIG. 9 is a flowchart showing an example of answer text generation processing according to the first embodiment.

FIG. 10 shows an example of an overall configuration of a question answering device (in learning time) according to a second embodiment.

FIG. 14 shows an example of an overall configuration of a question answering device (in inference time) according to the second embodiment.

FIG. 15 is a flowchart showing an example of inference processing according to the second embodiment.

FIG. 16 is a flowchart showing an example of answer text generation processing according to the second embodiment.

DESCRIPTION OF EMBODIMENTS

Hereinafter, embodiments of the present invention will be described.

First Embodiment

In the present embodiment, a question answering device 10 will be described that, when given an image including text and a question text related to the image, can generate an answer text that takes visual information in the image (for example, a location, a size, or the like of a text in the image) into consideration. The question answering device 10 according to the present embodiment can generate an answer text that takes into consideration not only the location or the size of a text in the image, but also visual information such as a graph, a photograph, or the like included in the image (in other words, auxiliary information that helps understand the text).

Note that it is assumed that an image including text is given to the question answering device 10, as described above. However, other than such a case, the present embodiment can also be similarly applied to the question answering device 10 when any data including text is given to the question answering device 10. Accordingly, in any cases where, for example, data including text, irrespective of formats such as HTML and PDF, is given to the question answering device 10, the present embodiment can be similarly applied to the question answering device 10. Examples of the data including text include an HTML document (web page) including text, a PDF document including text, an image of scenery including a caption or the like, document data, and the like.

Here, the question answering device 10 according to the present embodiment implements machine reading comprehension by using a neural network model. Accordingly, the question answering device 10 according to the present embodiment operates in learning time for learning parameters of the neural network model (hereinafter, also referred to as "model parameters"), and in inference time for performing machine reading comprehension by using the neural network model using the learned model parameters. Accordingly, hereinafter, the learning time and the inference time of the question answering device 10 will be described.

[Learning Time]

First, a description will be given regarding the learning time. A set of training data (training dataset), each sample of which includes an image including text, a question text related to the image, and a correct answer text indicating a correct answer to the question text, is input into the question answering device 10 in the learning time.

<Overall Configuration of Question Answering Device 10 in Learning Time>

Figure 1:
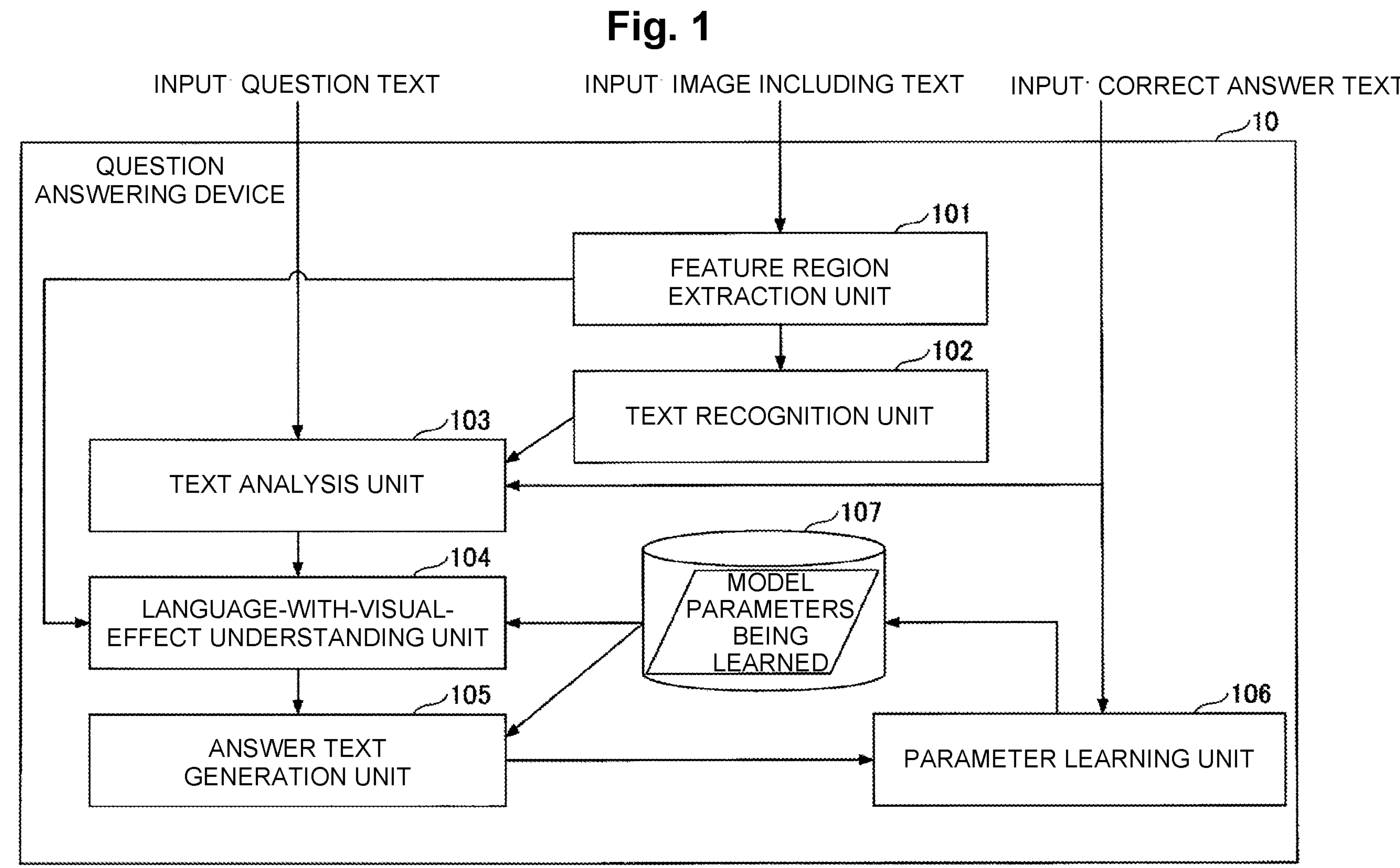
FIG. 1 shows an example of an overall configuration of a question answering device (in learning time) according to a first embodiment.

An overall configuration of the question answering device 10 in the learning time will be described with reference to FIG. 1. FIG. 1 shows an example of the overall configuration of the question answering device (in the learning time) according to the first embodiment.

As shown in FIG. 1, the question answering device 10 in the learning time includes a feature region extraction unit 101, a text recognition unit 102, a text analysis unit 103, a language-with-visual-effect understanding unit 104, an answer text generation unit 105, a parameter learning unit 106, and a parameter storage unit 107.

The feature region extraction unit 101 extracts feature regions from an input image. The text recognition unit 102 performs text recognition on a feature region including a text among the feature regions extracted by the feature region extraction unit 101, and outputs the text. The text analysis unit 103 divides each of the text output from the text recognition unit 102 and an input question text into a sequence of tokens. The text analysis unit 103 also divides a correct answer text into a sequence of tokens.

The language-with-visual-effect understanding unit 104 is implemented by a neural network and, by using model parameters being learned that are stored in the parameter storage unit 107, encodes sequences of tokens obtained by the text analysis unit 103. Thus, an encoded sequence can be obtained that takes visual information into consideration. In other words, language understanding can be achieved that also takes a visual effect in the image into consideration.

The answer text generation unit 105 is implemented by a neural network and, by using model parameters being learned that are stored in the parameter storage unit 107, calculates a probability distribution representing the probability that an answer text is generated from the encoded sequence obtained by the language-with-visual-effect understanding unit 104.

The parameter learning unit 106 updates the model parameters being learned that are stored in the parameter storage unit 107, by using a loss between an answer text generated by the answer text generation unit 105 and the input correct answer text. Thus, the model parameters are learned.

The parameter storage unit 107 stores the model parameters being learned (that is, model parameters to be learned) of the neural network models that implement the language-with-visual-effect understanding unit 104 and the answer text generation unit 105. The model parameters being learned refer to the model parameters that have not yet been learned.

<Learning Processing>

Figure 2:
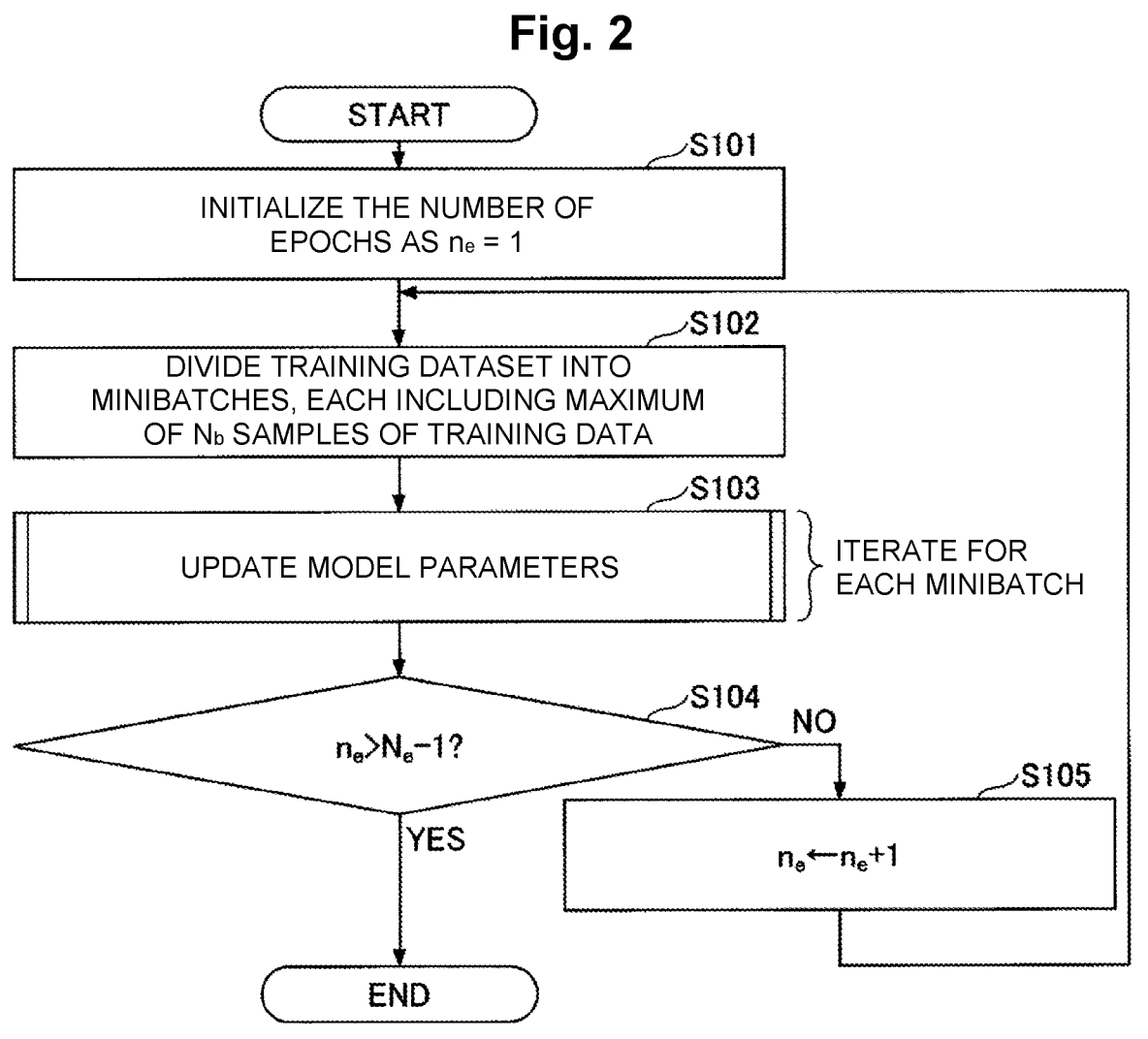

Next, learning processing according to the present embodiment will be described with reference to FIG. 2. FIG. 2 is a flowchart showing an example of the learning processing according to the first embodiment. Note that the following description corresponds to a case in which the model parameters being learned are learned by stochastic gradient descent, as an example. However, the model parameters being learned may be learned by any optimization scheme other than stochastic gradient descent.

First, the parameter learning unit 106 initializes a variable $n_e$ representing the number of epochs, to one (step S101).

Next, the parameter learning unit 106 divides an input training dataset into minibatches, each including a maximum of $N_b$ items of training data (step S102). $N_b$ is a preset value, and an any value may be set. For example, it is conceivable that $N_b=60$ or the like.

Next, the question answering device 10 performs model parameter update processing for each minibatch (step S103). Details of the model parameter update processing will be described later.

Next, the parameter learning unit 106 determines whether or not $n_e>N_e-1$ (step S104). $N_e$ is a preset number of epochs, and an any value may be set. For example, it is conceivable that $N_e=15$ or the like.

When it is determined in the step S104 that $n_e>N_e-1$, the parameter learning unit 106 terminates the learning processing. Thus, learning of the model parameters stored in the parameter storage unit 107 is completed.

When it is not determined in the step S104 that $n_e>N_e-1$, the parameter learning unit 106 adds one to $n_e$ (step S105), and returns to the step S102. Thus, the steps S102 and S103 are iteratively performed as many times as the number $N_e$ of epochs.

«Model Parameter Update Processing»

Figure 3:
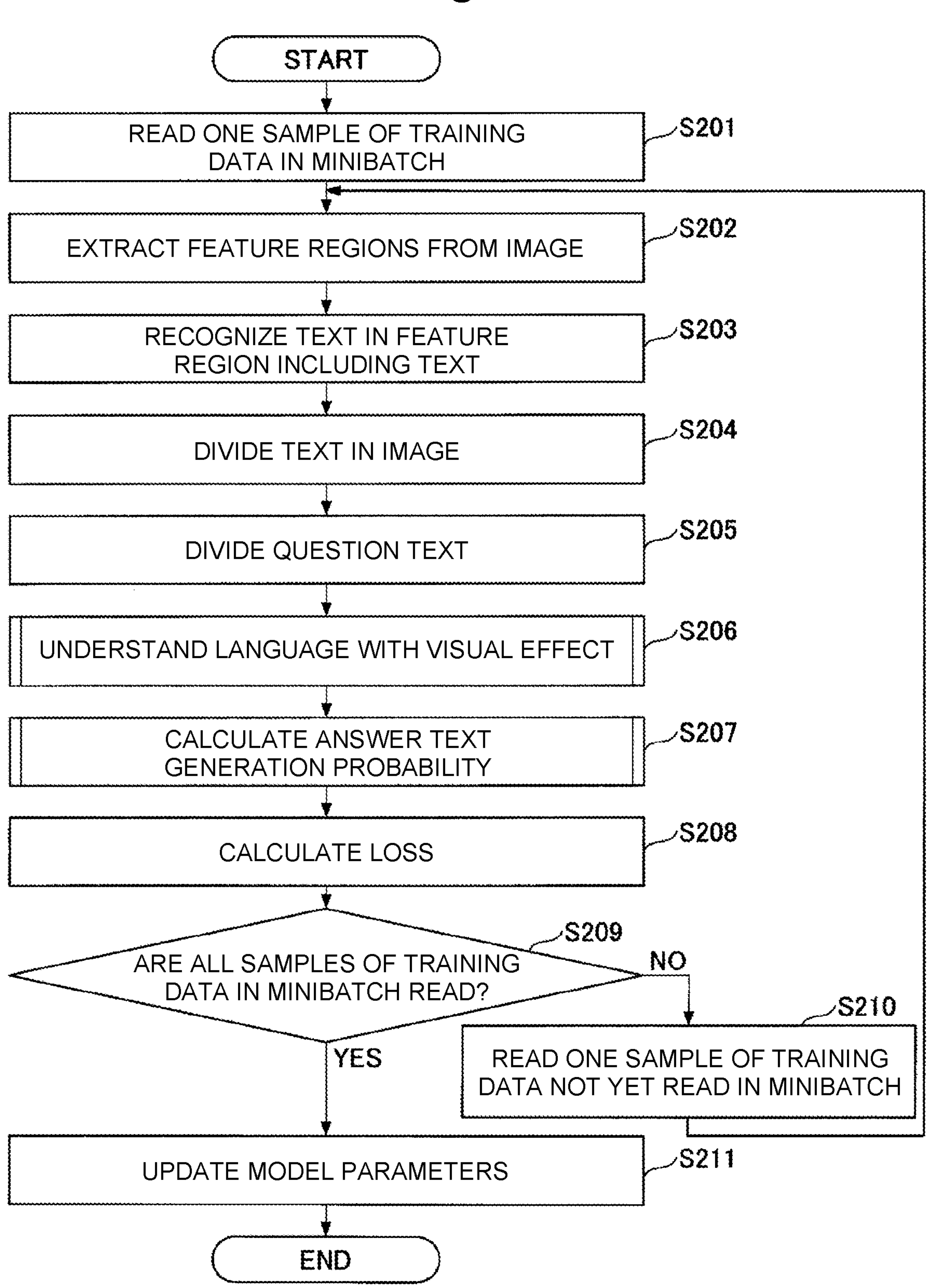
FIG. 3 is a flowchart showing an example of model parameter update processing according to the first embodiment.

Next, the details of the model parameter update processing in the step S103 will be described with reference to FIG. 3. FIG. 3 is a flowchart showing an example of the model parameter update processing according to the first embodiment. Note that in the following, the model parameter update processing with respect to a certain minibatch will be described.

First, the parameter learning unit 106 reads one item of training data in the minibatch (step S201).

Next, the feature region extraction unit 101 extracts K feature regions from an image included in the read training data (step S202). A feature region is a region based on a visual feature, and is assumed to be represented as a rectangular region in the present embodiment. Moreover, a k-th feature region is assumed to be denoted by an image token $i^k$ that has location information including upper-left coordinates, lower-right coordinates, a width, a height, and an area (a total of seven dimensions), a rectangular image representation (D dimensions), and a region type (of C types). However, for the location information, any information may be used as long as the information can specify a location of the feature region. For example, information on at least one of the width, the height, and the area may be eliminated, and upper-right coordinates and lower-left coordinates, or central coordinates, may be used in place of the upper-left coordinates and the lower-right coordinates. Moreover, information on either the rectangular image representation or the region type is not necessarily required. Note that, for example, when a feature region is a polygon (polygonal region), a rectangular region enclosing the polygon may be re-defined as a feature region.

Here, in the present embodiment, for region types, it is assumed that nine types are handled, including, for example, "Image", "Data (Diagram)", "Paragraph/Body", "Sub-data", "Heading/Title", "Caption", "Subtitle/Writer", "List", and "Other Text". Moreover, it is assumed that the types other than "Image" and "Data (Diagram)" are region types including text. However, such region types are examples, and any other region types may be set. For example, a region type of "Image Information" may be set, which is a collective type of "Image" and "Data (Diagram)", and a region type of "Text Information" may be set, which is a collective type of "Paragraph/Body", "Sub-data", "Heading/Title", "Caption", "Subtitle/Writer", "List", and "Other Text". As described above, for the region types, at least two types may be set, including a region type indicating that a feature region includes no text, and a region type indicating that a feature region includes text.

Figure 4:
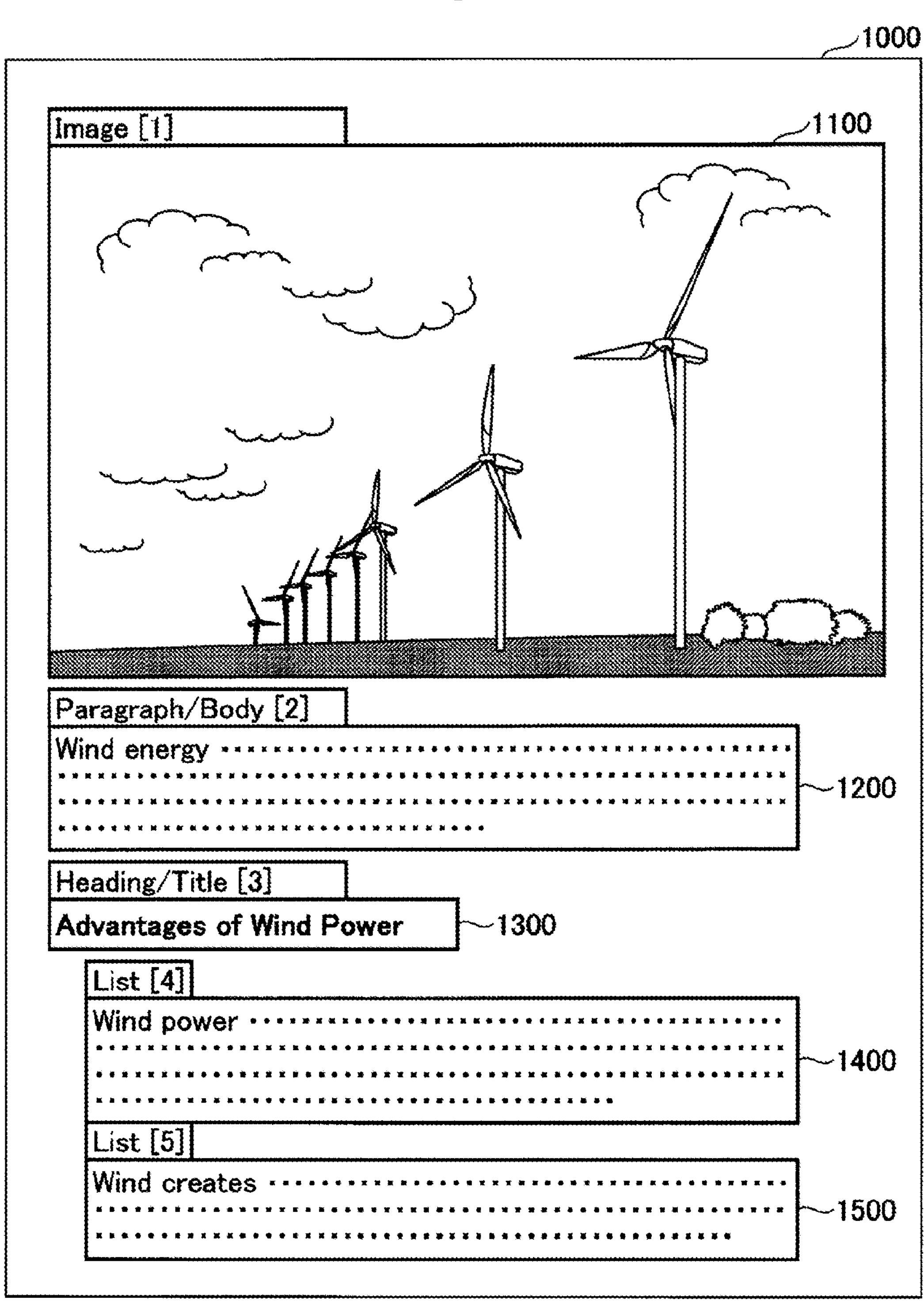
FIG. 4 is a diagram for describing an example of extraction of feature regions.

FIG. 4 shows an example of the extraction of feature regions by the feature region extraction unit 101. In the example shown in FIG. 4, a case is illustrated in which five feature regions including a feature region 1100, a feature region 1200, a feature region 1300, a feature region 1400, and a feature region 1500 are extracted from an image 1000 including text. Moreover, in the example shown in FIG. 4, the region type of the feature region 1100 is "Image", the region type of the feature region 1200 is "Paragraph/Body", the region type of the feature region 1300 is "Heading/Title", the region type of the feature region 1400 is "List", and the region type of the feature region 1500 is "List".

Note that for the extraction of such feature regions, for example, Faster R-CNN described in Reference Literature 1 "Shaoqing Ren, Kaiming He, Ross B. Girshick, Jian Sun: Faster R-CNN: Towards Real-Time Object Detection with Region Proposal Networks. NIPS 2015: 91-99", or the like can be used. However, any other scheme (for example, object recognition technology or the like) can also be used as long as the scheme can extract a region based on a visual feature. Apart from such schemes, for example, feature regions may be manually extracted (that is, image tokens, for each of which, for example, upper-left coordinates, lower-right coordinates, a region type, and the like are manually set, may be created) from an input image.

Next, the text recognition unit 102 performs text recognition on a feature region of a region type indicating that the feature region includes text, among the feature regions extracted in the step S202, and outputs the text (step S203). Note that for the text recognition, for example, Tesseract described in Reference Literature 2 "Google: Tesseract Manual. 2018. Internet <URL: https://github.com/tesseract-ocr/tesseract/blob/master/doc/tesseract.1.asc>", or the like can be used.

Next, the text analysis unit 103 divides the text output in the step S203 into a sequence of text tokens (step S204). Hereinafter, assuming that a text is included in a k-th feature region, a sequence of text tokens obtained by dividing the text is represented as follows.

$$(x_1^k, x_2^k, \ldots, x_{L^k}^k) \quad \text{[Math. 1]}$$

$L^k$ is the number of tokens of the text included in the k-th feature region. For such division, for example, Byte-level BPE described in Reference Literature 3 "Alec Radford, Jeffrey Wu, Rewon Child, David Luan, Dario Amodei, and Ilya Sutskever: Language models are unsupervised multitask learners. Technical report, OpenAI, 2019.", or the like can be used.

Note that the text is divided into a sequence of subword tokens because of use of the above-mentioned Byte-level BPE. However, instead of subword tokens, for example, a sequence of words separated by a blank or the like may be used for the sequence of text tokens.

Next, as in the step S204, the text analysis unit 103 divides a question text included in the read training data into a sequence of question tokens ($x_1^q, x_2^q, \ldots, x_J^q$) (step S205). J is the number of tokens of the question text. Note that the sequence of question tokens is a sequence of subword tokens.

Figure 5:
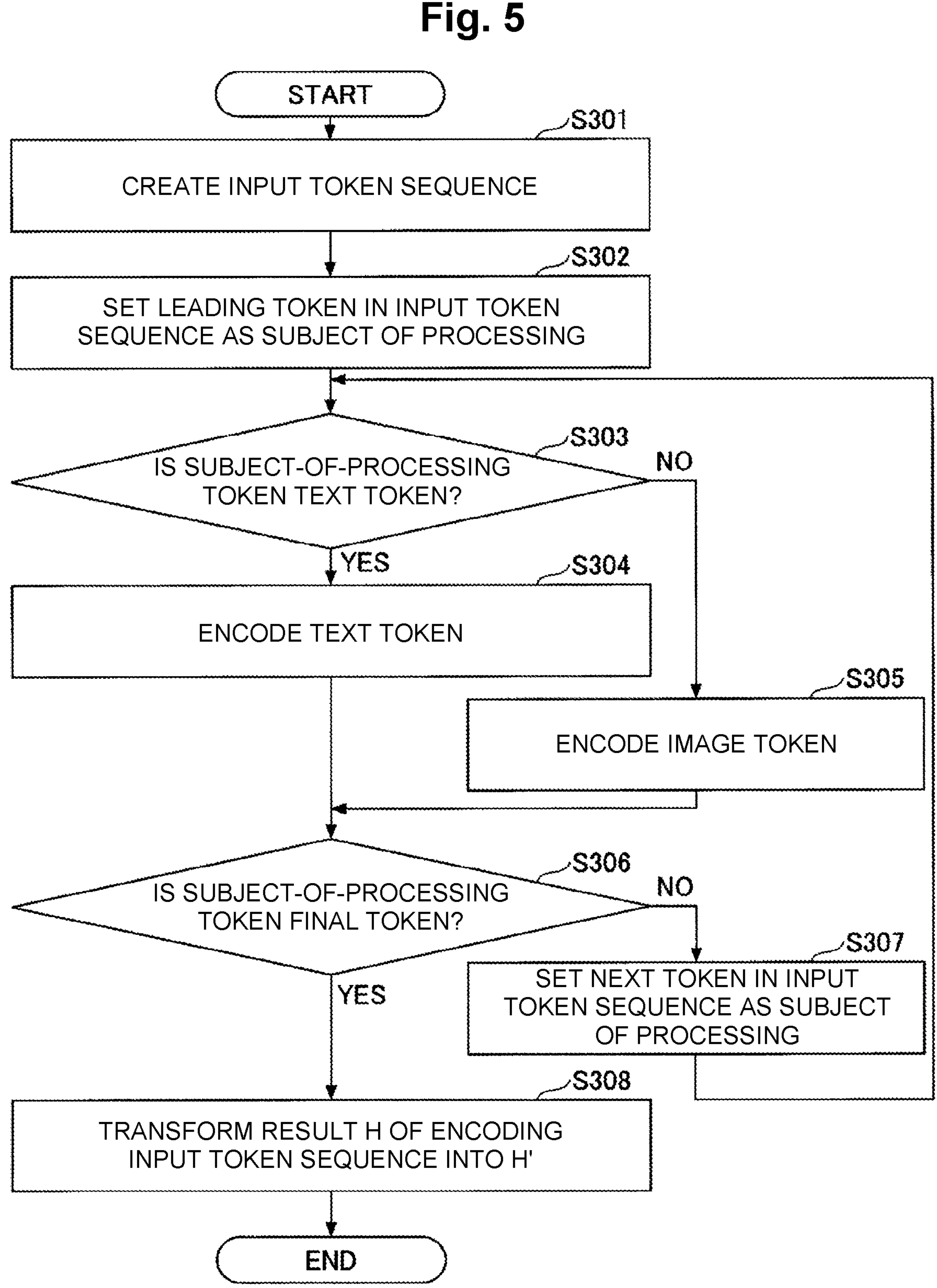
FIG. 5 is a flowchart showing an example of language-with-visual-effect understanding processing according to the first embodiment.

Next, the question answering device 10 performs language-with-visual-effect understanding processing and obtains an encoded sequence that takes visual information into consideration (step S206). Here, details of the language-with-visual-effect understanding processing will be described with reference to FIG. 5. FIG. 5 is a flowchart showing an example of the language-with-visual-effect understanding processing according to the first embodiment.

First, the language-with-visual-effect understanding unit 104, by using the image tokens, the sequences of text tokens, and the sequence of question tokens, creates an input token sequence as follows (step S301).

$$[CLS], x_1^q, x_2^q, \ldots, x_J^q [SEP], i^1, x_1^1, x_2^1, \ldots, x_{L^1}^1, i^2, x_1^2, x_2^2, \ldots, x_{L^2}^2, i^K, x_1^K, x_2^K, \ldots, x_{L^K}^K, [EOS] \quad \text{[Math. 2]}$$

[CLS], [SEP], [EOS] are special tokens, each of which is treated as a type of text token. In the present embodiment, it is assumed that [CLS]='<s>', [SEP]='</s>', [EOS]='</s>' are used. Note that when no text is included in a k-th feature region, the k-th sequence of text tokens $$(x_1^k, x_2^k, \ldots, x_{L^k}^k) \quad \text{[Math. 3]}$$

has a length of zero. Alternatively, when no text is included in a k-th feature region, the step S206 may be configured not to process the k-th sequence of text tokens.

Hereinafter, it is assumed that the length of the input token sequence is L. In general, L is adjusted to be a predetermined length (for example, L=512, or the like). If the length of the input token sequence exceeds L, the length L of the input token sequence is made to be the predetermined length, such as by deleting the longest text of texts included in the feature regions or by subjecting each text to equal deletion. In contrast, when the length L of the input token sequence is short of the predetermined length, padding may be performed with a special token.

Next, the language-with-visual-effect understanding unit 104 sets a leading token in the input token sequence as a subject of processing (step S302).

Next, the language-with-visual-effect understanding unit 104 determines whether or not the token set as the subject of processing is a text token (step S303). Here, a text token is any one of a token included in the sequence of question tokens, a token included in the sequences of text tokens, and special tokens such as [CLS], [SEP], [EOS] (that is, a subword token).

When it is determined in the step S303 that the subject-of-processing token is a text token, the language-with-visual-effect understanding unit 104 encodes the subject-of-processing token (step S304). Here, in the present embodiment, it is assumed that the language-with-visual-effect understanding unit 104 is implemented by a neural network model including BERT (Bidirectional Encoder Representations from Transformers), and that the language-with-visual-effect understanding unit 104 encodes the subject-of-processing token as follows.

$$h=\mathrm{LayerNorm}\ (\mathrm{TokenEmb}(x)+\mathrm{PositionEmb}(x)+\mathrm{SegmentEmb}(x))$$

x denotes the subject-of-processing token (that is, a subword token), and h denotes the encoded subject-of-processing token. Note that for BERT, for example, Reference Literature 4 "Jacob Devlin, Ming-Wei Chang, Kenton Lee, Kristina Toutanova, "BERT: Pre-training of Deep Bidirectional Transformers for Language" can be referenced.

TokenEmb is processing in which the subword token is transformed into a corresponding G-dimensional vector through the neural network model. In the present embodiment, it is assumed that an embedding vector (G=1024) learned as in Reference Literature 5 "Mike Lewis, Yinhan Liu, Naman Goyal, Marjan Ghazvininejad, Abdelrahman Mohamed, Omer Levy, Ves Stoyanov, Luke Zettlemoyer: BART: Denoising Sequence-to-Sequence Pre-training for Natural Language Generation, Translation, and Comprehension, arXiv, 2019." is used for initial values of model parameters of the neural network model, and the model parameters are to be learned. Note that parameters of a language model pre-trained by a scheme other than that of Reference Literature 5 may be model parameters to be learned.

PositionEmb is processing in which the subword token is transformed into a G-dimensional vector, depending on a position of the subject-of-processing token in the input token sequence, through a neural network model. In the present embodiment, a scheme described in Reference Literature 6 "Ashish Vaswani, Noam Shazeer, Niki Parmar, Jakob Uszkoreit, Llion Jones, Aidan N Gomez, Lukasz Kaiser, and Illia Polosukhin. Attention is all you need. In Advances in neural information processing systems, pp. 5998-6008, 2017." is used.

SegmentEmb is processing in which the subword token is transformed into a G-dimensional vector, depending on a segment of the subject-of-processing token in the input token sequence. In the present embodiment, segments are not discriminated, and a vector after transformation is treated as a G-dimensional zero vector. A segment is information for discriminating each text input into BERT. In the present embodiment, since the image token $i^k$ performs a role as a segment, segments are not discriminated in SegmentEmb. Note that although SegmentEmb is used in the present embodiment because BERT requires SegmentEmb, SegmentEmb is not required when BERT is not used.

LayerNorm takes G-dimensional vectors as inputs, and outputs a G-dimensional vector by using a normalization scheme described in Reference Literature 7 "Jimmy Lei Ba, Jamie Ryan Kiros, Geoffrey E. Hinton: Layer Normalization. Arxiv, 2016."

In contrast, when it is not determined in the step S303 that the subject-of-processing token is a text token (that is, when the subject-of-processing token is an image token), the language-with-visual-effect understanding unit 104 encodes the subject-of-processing token as follows (step S305).

$$h=\mathrm{LayerNorm}(\mathrm{ImgfEmb}(i)+\mathrm{LocationEmb}(i)+\mathrm{SegmentEmb}(i))$$

"i" denotes the subject-of-processing token (that is, an image token), and h denotes the encoded subject-of-processing token. SegmentEmb and LayerNorm are as described in the step S304.

ImgfEmb is processing in which the rectangular image representation included in the image token is transformed from D dimensions into G dimensions through a feed forward network model including a fully connected layer. In the present embodiment, it is assumed that a feed forward network model including one fully connected layer is used, and that model parameters of the feed forward network model are model parameters to be learned.

LocationEmb is processing in which the location information included in the image token is transformed from seven dimensions into D dimensions through a feed forward network model including a fully connected layer. In the present embodiment, it is assumed that a feed forward network model including one fully connected layer is used, and that model parameters of the feed forward network model are model parameters to be learned.

Subsequent to the step S304 or step S305, the language-with-visual-effect understanding unit 104 determines whether or not the subject-of-processing token is a final token in the input token sequence (step S306).

When it is not determined in the step S306 that the subject-of-processing token is a final token, the language-with-visual-effect understanding unit 104 sets a token next to the current subject-of-processing token in the input token sequence as a subject of processing (step S307), and returns to the step S303. Thus, each token in the input token sequence is encoded, and an encoded sequence $H=(h_1, h_2, \ldots, h_L)$ is obtained. Note that $h_r$ is an r-th ($r=1, 2, \ldots, L$) token encoded, in the input token sequence.

In contrast, when it is determined in the step S306 that the subject-of-processing token is a final token, the language-with-visual-effect understanding unit 104 transforms the encoded sequence H of the input token sequence into H' through TransformerEncoder with M layers (step S308). In other words, the language-with-visual-effect understanding unit 104 implements H'=TransformerEncoder(H). For TransformerEncoder, for example, the above-mentioned Reference Literature 5 or the like can be referenced. In the present embodiment, it is assumed that M=12, that TransformerEncoder trained as in the above-mentioned Reference Literature 5 is used for initial values, and that parameters of the TransformerEncoder are model parameters to be learned.

Figure 6:
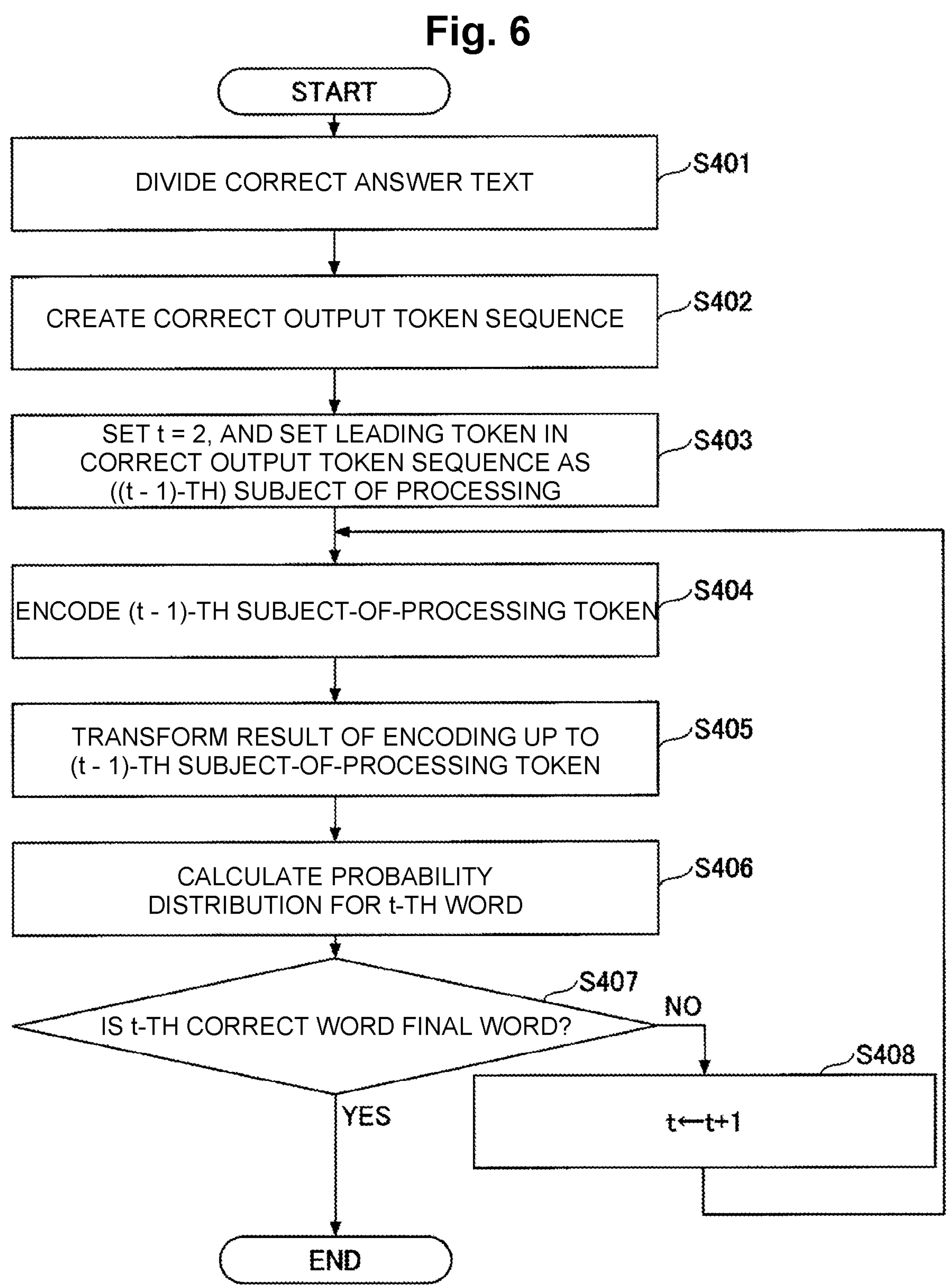
FIG. 6 is a flowchart showing an example of answer text generation probability calculation processing according to the first embodiment.

Referring back to FIG. 3, subsequent to step S206, the question answering device 10 performs answer text generation probability calculation processing and calculates a probability distribution representing the probability that an answer text is generated (step S207). Here, details of the answer text generation probability calculation processing will be described with reference to FIG. 6. FIG. 6 is a flowchart showing an example of the answer text generation probability calculation processing according to the first embodiment.

First, as in the step S204, the text analysis unit 103 divides a correct answer text included in the read training data into a sequence of correct answer tokens represented as follows (step S401).

$$\left(y_1^*, y_2^*, \ldots, y_{L^T}^*\right) \quad \text{[Math. 4]}$$

$L^T$ is the number of tokens in the sequence of correct answer tokens and is a predetermined value (accordingly, the sequence of correct answer tokens has been subjected to padding, token deletion, or the like as necessary such that the number of tokens becomes $L^T$). Note that the sequence of correct answer tokens is a sequence of subword tokens.

Next, the language-with-visual-effect understanding unit 104, by using the sequence of correct answer tokens obtained in the step S401, creates a following correct output token sequence (step S402).

$$[CLS], y_1^*, y_2^*, \ldots, y_{L^T}^*, [EOS] \quad \text{[Math. 5]}$$

Hereinafter, the correct output token sequence is denoted by Y*.

Next, the language-with-visual-effect understanding unit 104 sets t=2, and sets a leading token in the correct output token sequence Y* as a subject of processing ((t−1)-th subject-of-processing token) (step S403).

Next, as in step S304 in FIG. 5, the language-with-visual-effect understanding unit 104 encodes the subject-of-processing token as follows (step S404).

$$h^{y^*}=\text{LayerNorm}(\text{TokenEmb}(y^*)+\text{PositionEmb}(y^*)+\text{SegmentEmb}(y^*))$$

y* denotes the subject-of-processing token (that is, a subword token), and $h^{y^*}$ denotes the encoded subject-of-processing token.

Hereinafter, an encoded sequence representing a result of encoding up to the (t−1)-th subject-of-processing token is denoted by $H^{y^*}=(h_1^{y^*}, h_2^{y^*}, \ldots h_{t-1}^{y^*})$.

Next, the language-with-visual-effect understanding unit 104 transforms the encoded sequence H' obtained through the language-with-visual-effect understanding processing and the encoded sequence $H^{y^*}=(h_1^{y^*}, h_2^{y^*}, \ldots, h_{t-1}^{y^*})$ obtained in the step S404, by using TransformerDecoder with M layers (step S405). In other words, the language-with-visual-effect understanding unit 104 implements $h_t^y$=TransformerDecoder($H^{y^*}$, H').

Note that for TransformerDecoder, for example, the above-mentioned Reference Literature 5 or the like can be referenced. In the present embodiment, it is assumed that M=12, that TransformerDecoder trained as in the above-mentioned Reference Literature 5 is used for initial values, and that parameters of the TransformerDecoder are model parameters to be learned. Note that parameters of a language model pre-trained by a scheme other than that of Reference Literature 5 may be model parameters to be learned.

Next, the answer text generation unit 105 calculates $p(y_t|y_{<t}^*)$, a distribution of the probability that a t-th word is generated (step S406). A probability distribution for a word $y_t$ in a preset output vocabulary (V words) is calculated as $p(y_t|y_{<t}^*)=\text{softmax}(Wh_t^y+b)$. Here, $W \in E\, R^{V \times G}$, $b \in R^V$ are model parameters to be learned. For the number V of words, for example, 50257 or the like is conceivable, although an any value may be set.

Next, the language-with-visual-effect understanding unit 104 determines whether or not a correct word $y_t^*$ is a final word (step S407). The final word is a $t=L^T$-th word or a special word [EOS] indicating a text end. Note that when the correct word $y_t^*$ is the word indicating the text end and when $t<L^T$, the answer text generation unit 105 performs padding with a special word, between (t+1) and $L^T$.

When it is not determined in the step S407 that a correct word $y_t^*$ is a final word, the language-with-visual-effect understanding unit 104 adds one to t (step S408), and returns to step S404. Thus, the steps S404 to S406 are iteratively performed.

Referring back to FIG. 3, subsequent to step S207, the parameter learning unit 106 calculates a loss “Loss” by using the probability distribution $p(y_t|y_{<t}^*)$ calculated in step S406 in FIG. 6 (step S208). The parameter learning unit 106 may calculate the loss “Loss”, for example, as follows.

$$\text{Loss} = -\frac{1}{T}\sum_t \ln(p(y_t^* \mid y_{<t}^*)) \quad \text{[Math. 6]}$$

T is an actual length of the sequence of correct answer tokens (that is, a length before padding or the like is performed). $p(y_t^*|y_{<t}^*)$ denotes a probability that a word $y_t^*$ (that is, a correct word) is generated.

Next, the parameter learning unit 106 determines whether or not all items of training data in the minibatch are read (step S209).

When it is determined in the step S209 that there is training data that is not yet read in the minibatch, the parameter learning unit 106 reads one item of training data that is not yet read (step S210), and returns to the step S202. Thus, for each piece of training data in the minibatch, the steps S202 to S208 are iteratively performed.

In contrast, when it is determined in the step S209 that all items of training data in the minibatch are read, the parameter learning unit 106 updates the model parameters by using the loss “Loss” calculated for each piece of training data in the step S208 (step S211). In other words, the parameter learning unit 106 updates the model parameters such that the losses “Loss” are minimized, by using a known optimization scheme.

As described above, in the question answering device 10 according to the present embodiment, when an image including text and a question text related to the image are given, the model parameters are learned such that an answer text that takes visual information in the image into consideration is generated. In other words, the model parameters are learned such that machine reading comprehension that takes visual information into consideration can be achieved.

[Inference Time]

Next, a description will be given regarding the inference time. Test data including an image including text and a question text related to the image is input into the question answering device 10 in the inference time.

<Overall Configuration of Question Answering Device 10 in Inference Time>

Figure 7:
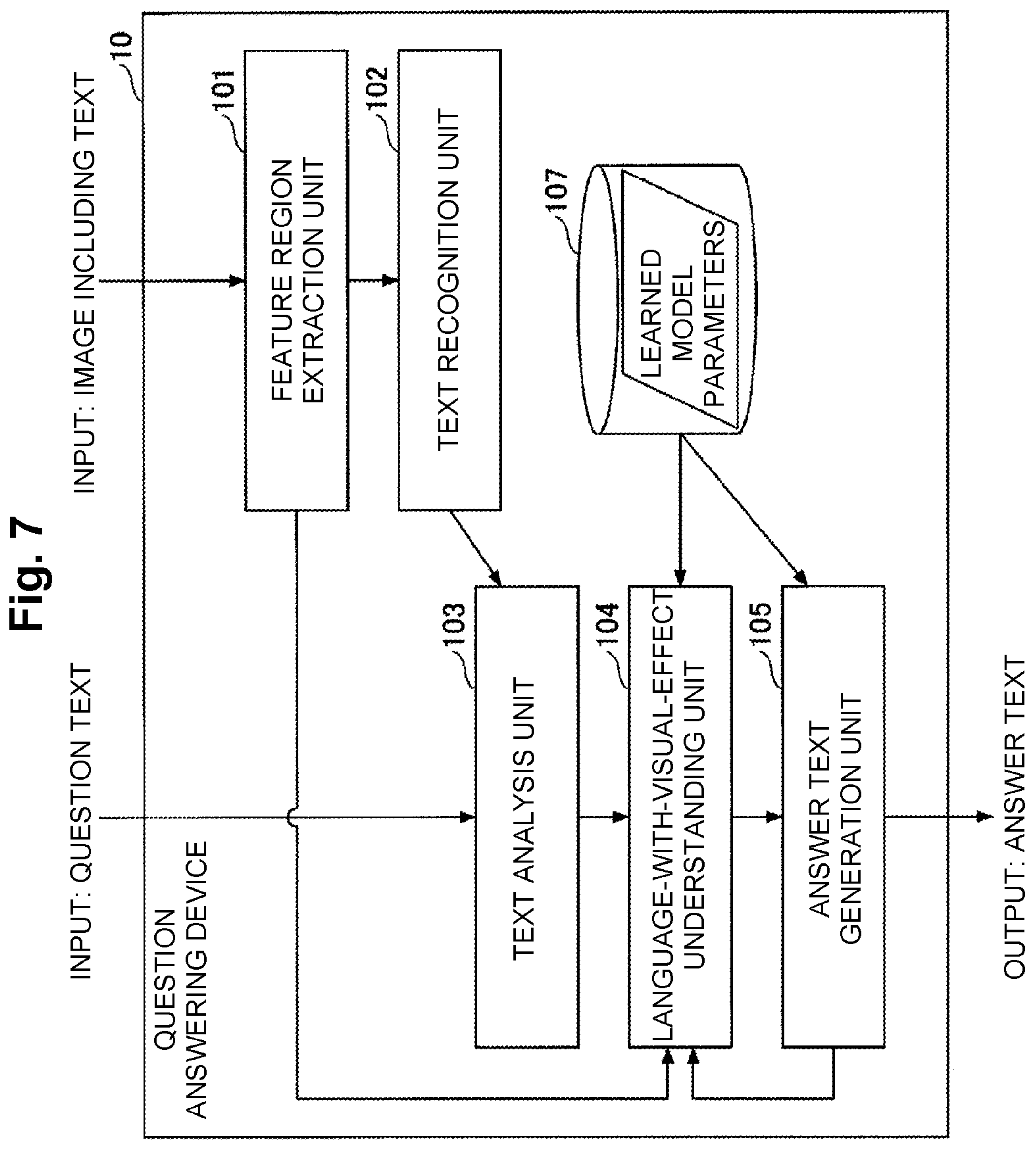
FIG. 7 shows an example of an overall configuration of a question answering device (in inference time) according to the first embodiment.

An overall configuration of the question answering device 10 in the inference time will be described with reference to FIG. 7. FIG. 7 shows an example of the overall configuration of the question answering device (in the inference time) according to the first embodiment.

As shown in FIG. 7, the question answering device 10 in the inference time includes a feature region extraction unit 101, a text recognition unit 102, a text analysis unit 103, a language-with-visual-effect understanding unit 104, an answer text generation unit 105, and a parameter storage unit 107. Among these units, the feature region extraction unit 101, the text recognition unit 102, and the text analysis unit 103 are substantially the same as in the learning time. On the other hand, the language-with-visual-effect understanding unit 104 and the answer text generation unit 105 use the learned model parameters stored in the parameter storage unit 107. Moreover, the answer text generation unit 105 generates an answer text by using a probability distribution calculated based on an encoded sequence obtained by the language-with-visual-effect understanding unit 104.

<Inference Processing>

Figure 8:
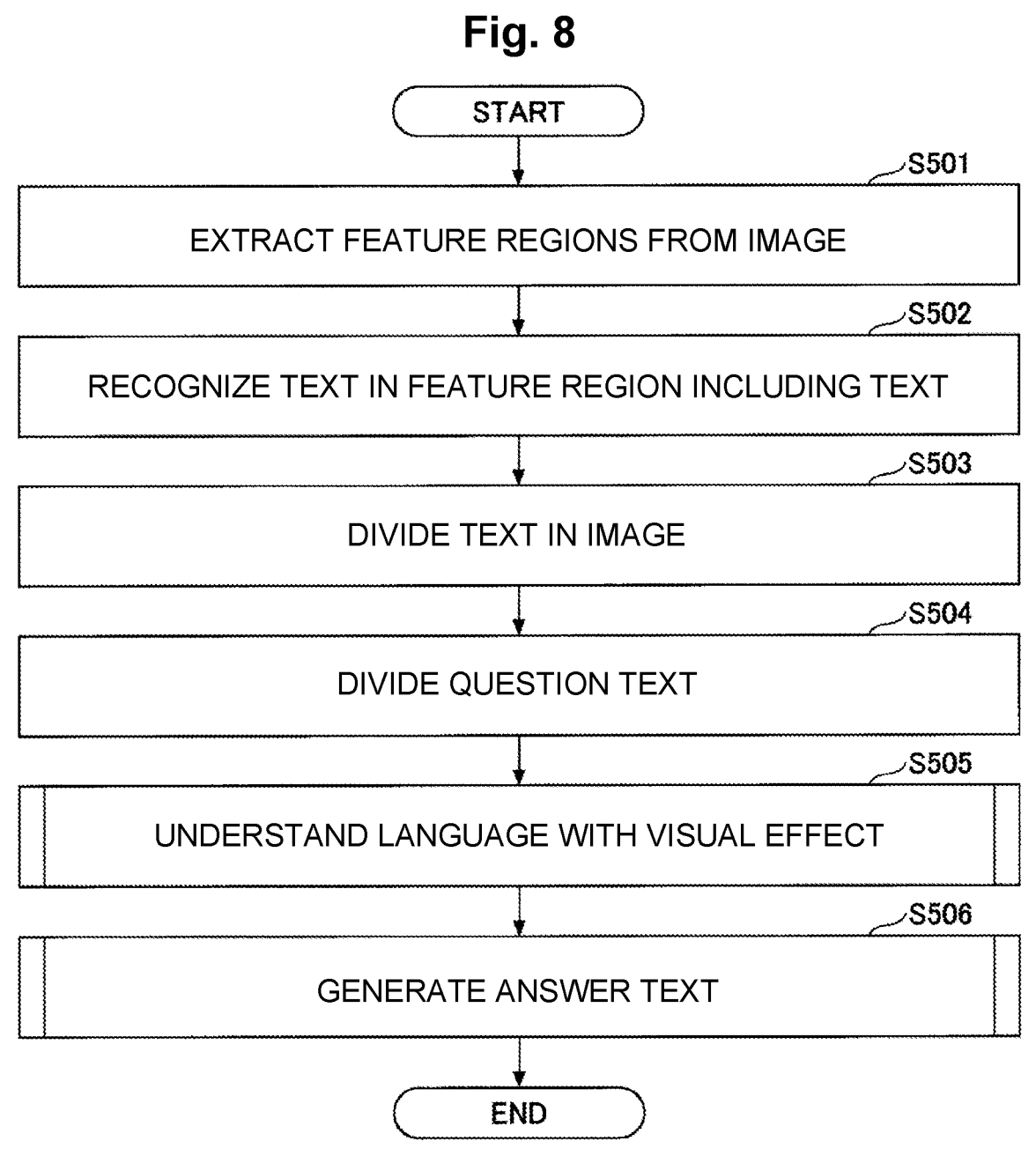

Next, inference processing according to the present embodiment will be described with reference to FIG. 8. FIG. 8 is a flowchart showing an example of the inference processing according to the first embodiment. Hereinafter, it is assumed that the test data given to the question answering device 10 is already read.

First, as in step S202 in FIG. 3, the feature region extraction unit 101 extracts K feature regions from the image included in the read test data (step S501).

Next, as in step S203 in FIG. 3, the text recognition unit 102 performs text recognition on a feature region of a region type indicating that the feature region includes text, among the feature regions extracted in the step S501, and outputs the text (step S502).

Next, as in step S204 in FIG. 3, the text analysis unit 103 divides the text output in the step S502 into a sequence of text tokens (step S503).

Next, as in step S205 in FIG. 3, the text analysis unit 103 divides the question text included in the read test data into a sequence of question tokens (step S504).

Next, the question answering device 10 performs language-with-visual-effect understanding processing and obtains an encoded sequence that takes visual information into consideration (step S505). Since the language-with-visual-effect processing is similar to step S206 in FIG. 3, a description thereof is omitted. Hereinafter, the description will be continued, assuming that the encoded sequence H' has been obtained.

Figure 9:
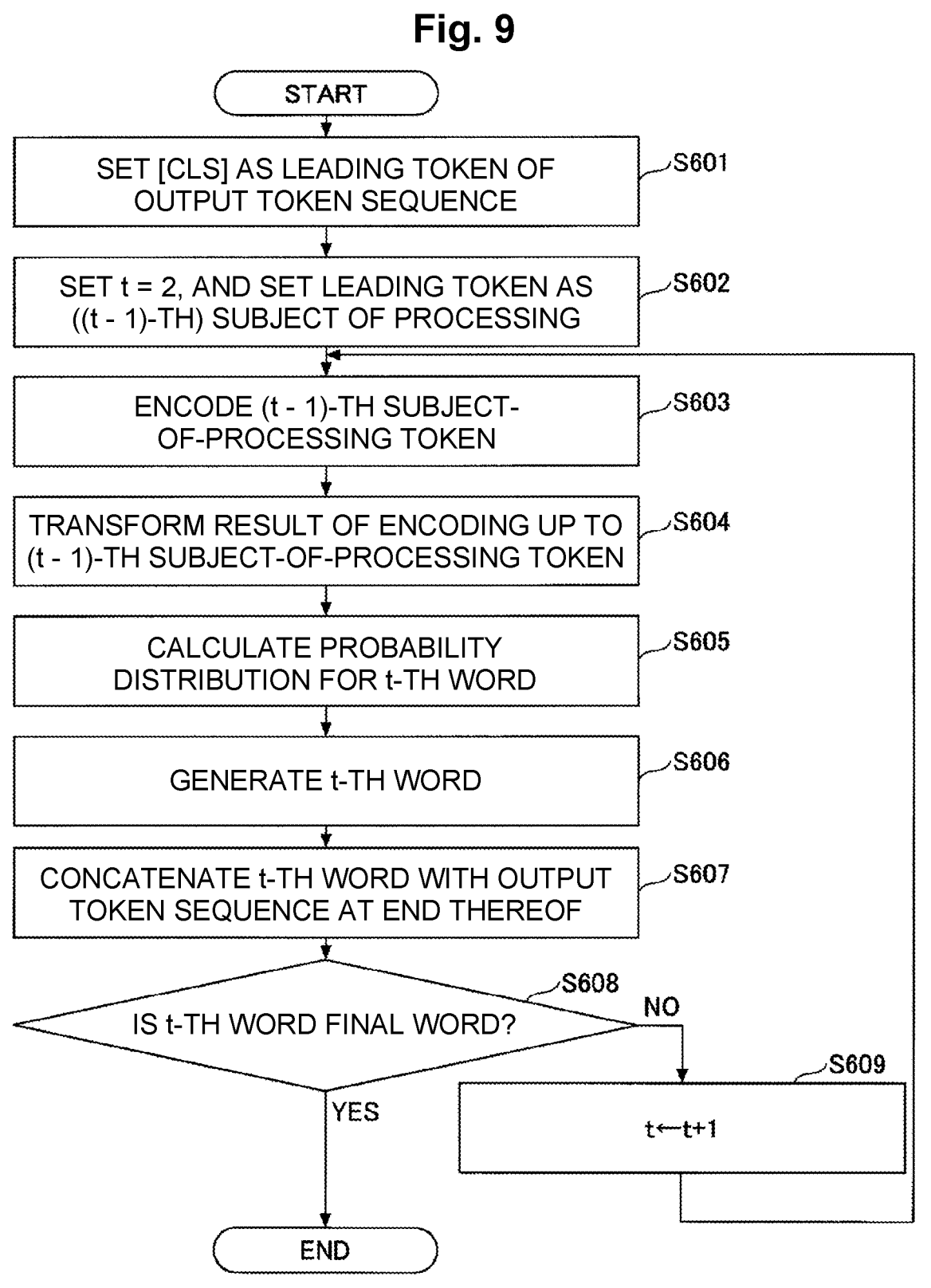

Next, the question answering device 10 performs answer text generation processing and generates an answer text (step S506). Here, details of the answer text generation processing will be described with reference to FIG. 9. FIG. 9 is a flowchart showing an example of the answer text generation processing according to the first embodiment.

First, the answer text generation unit 105 sets [CLS] as a leading token of an output token sequence (step S601). At this point of time, a token included in the output token sequence is only [CLS].

Next, the language-with-visual-effect understanding unit 104 sets t=2, and sets a leading token of the output token sequence as a subject of processing ((t−1)-th subject-of-processing token) (step S602).

Next, as in step S404 in FIG. 6, the language-with-visual-effect understanding unit 104 encodes the subject-of-processing token as follows (step S603).

$$h^y = \text{LayerNorm}(\text{TokenEmb}(y) + \text{PositionEmb}(y) + \text{SegmentEmb}(y))$$

y denotes the subject-of-processing token (that is, a subword token), and $h^y$ denotes the encoded subject-of-processing token.

Hereinafter, an encoded sequence representing a result of encoding up to the (t−1)-th subject-of-processing token is denoted by $H^y = (h_1^y, h_2^y, \ldots, h_{t-1}^y)$.

Next, as in step S405 in FIG. 6, the language-with-visual-effect understanding unit 104 transforms the encoded sequence H' obtained through the language-with-visual-effect understanding processing and the encoded sequence $H^y$ obtained in the step S603, by using TransformerDecoder with M layers (step S604). In other words, the language-with-visual-effect understanding unit 104 implements $h_t^y = \text{TransformerDecoder}(H^y, H')$. Thus, $H^{y\prime} = (h_1^y, h_2^y, \ldots, h_{t-1}^y, h_t^y)$ is obtained.

Next, the answer text generation unit 105 calculates $p(y_t|y_{<t})$, a distribution of the probability that a t-th word is generated (step S605). A probability distribution for a word $y_t$ in a preset output vocabulary (V words) is calculated as $p(y_t|y_{<t}) = \text{softmax}(Wh_t^y + b)$. Here, $W \in R^{V \times G}$, $b \in R^V$ are the learned model parameters.

Next, the answer text generation unit 105 generates the t-th word, based on the probability distribution $p(y_t|y_{<t})$ calculated in the step S605 (step S606). The answer text generation unit 105 may generate a word with a maximum probability as the t-th word, or may generate the t-th word by sampling according to the probability distribution.

Next, the answer text generation unit 105 concatenates the t-th word generated in the step S606 with the output token sequence at an end thereof (step S607).

Next, the language-with-visual-effect understanding unit 104 determines whether or not the t-th word generated in the step S606 is a final word (step S608). The final word is a special word [EOS] indicating a text end.

When it is not determined in the step S608 that the t-th word is a final word, the language-with-visual-effect understanding unit 104 adds one to t (step S609), and returns to step S603. Thus, the steps S603 to S607 are iteratively performed, and a sequence of words is obtained.

As described above, in the question answering device 10 according to the present embodiment, when an image including text and a question text related to the image are given, an answer text (a sequence of words) that takes visual information in the image into consideration can be generated.

Second Embodiment

In the present embodiment, a case will be described in which an answer text is generated, taking into consideration also whether or not a feature region extracted by a feature region extraction unit 101 is information necessary to answer a question.

Note that in the present embodiment, a description will be given mainly of differences from the first embodiment, and a description of components similar to those of the first embodiment is omitted.

[Learning Time]

First, a description will be given regarding learning time. It is assumed that training data input into a question answering device 10 in the learning time includes a set of correct feature regions, in addition to an image including text, a question text, and a correct answer. The set of correct feature regions is a set of feature regions necessary to obtain the correct answer, among feature regions extracted from the image.

<Overall Configuration of Question Answering Device 10 in Learning Time>

An overall configuration of the question answering device 10 in the learning time will be described with reference to FIG. 10. FIG. 10 shows an example of the overall configuration of the question answering device 10 (in the learning time) according to the second embodiment.

As shown in FIG. 10, the question answering device 10 in the learning time includes the feature region extraction unit 101, a text recognition unit 102, a text analysis unit 103, a language-with-visual-effect understanding unit 104, an answer text generation unit 105, a parameter learning unit 106, a related feature region determination unit 108, and a parameter storage unit 107. The second embodiment is different from the first embodiment mainly in a point that the question answering device 10 includes the related feature region determination unit 108.

The related feature region determination unit 108 is implemented by a neural network and, by using model parameters being learned that are stored in the parameter storage unit 107, calculates a probability indicating whether or not a feature region extracted by the feature region extraction unit 101 is information necessary to answer a question. Accordingly, the model parameters being learned that are stored in the parameter storage unit 107 also include model parameters being learned of a neural network model that implements the related feature region determination unit 108.

The parameter learning unit 106 calculates a loss by using also the probability calculated by the related feature region determination unit 108 and the set of correct feature regions, and updates the model parameters being learned that are stored in the parameter storage unit 107.

<Learning Processing>

Next, learning processing according to the present embodiment will be described. Since an overall flow of the learning processing may be similar to that of the learning processing described in FIG. 2, in the following, details of the model parameter update processing in step S103 in FIG. 2 will be described. However, the number $N_e$ of epochs and the maximum number $N_b$ of items of training data included in a minibatch may be made different from those of the first embodiment. For example, the maximum number $N_b$ of items of training data included in a minibatch may be set as $N_b$=32 or the like.

«Model Parameter Update Processing»

Figure 11:
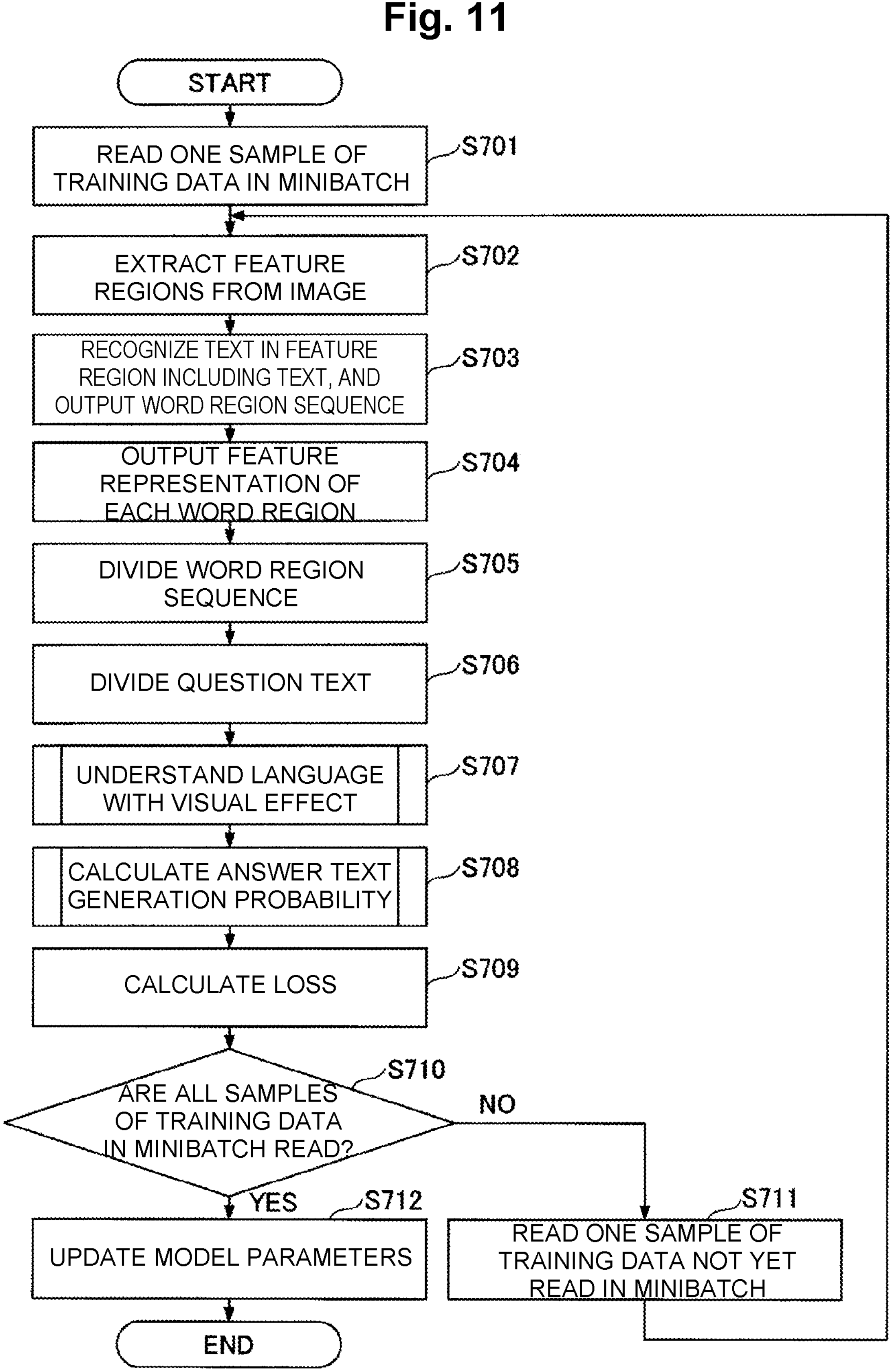
FIG. 11 is a flowchart showing an example of model parameter update processing according to the second embodiment.

The details of the model parameter update processing in step S103 in FIG. 2 will be described with reference to FIG. 11. FIG. 11 is a flowchart showing an example of the model parameter update processing according to the second embodiment. Note that in the following, the model parameter update processing with respect to a certain minibatch will be described.

First, the parameter learning unit 106 reads one item of training data in the minibatch (step S701).

Next, the feature region extraction unit 101 extracts K feature regions from an image included in the read training data (step S702). In the present embodiment, it is assumed that a feature region is represented as a rectangular region as in the first embodiment, and that a k-th feature region has location information including upper-left coordinates and lower-right coordinates (a total of four dimensions), a rectangular image representation (D dimensions), and a region type (of C types). However, for the location information, any information may be used as long as the information can specify a location of the feature region, and information on either the rectangular image representation or the region type is not necessarily required. In addition, for example, when a feature region is a polygon (polygonal region), a rectangular region enclosing the polygon may be re-defined as a feature region, as in the first embodiment.

Moreover, for region types, it is also assumed that nine types are handled, as in the first embodiment. However, it is needless to say that the nine region types are examples, and another region type may be set. As in the first embodiment, at least two types, including a region type indicating that a feature region includes no text and a region type indicating that a feature region includes text, may be set also in the present embodiment.

Note that for the extraction of feature regions, for example, Faster R-CNN described in the above-mentioned Reference Literature 1 or the like may be used, as in the first embodiment. Moreover, in the present embodiment, for example, D=2048 or the like.

Next, the text recognition unit 102 performs text recognition on a feature region of a region type indicating that the feature region includes text, among the feature regions extracted in the step S702, and outputs a word region sequence including word regions that are regions including words as a result of the text recognition (step S703). Hereinafter, it is assumed that each word region is a rectangular region, and has location information including upper-left coordinates and lower-right coordinates of the word region (a total of four dimensions) and a word obtained through the text recognition. For the text recognition, for example, Tesseract described in the above-mentioned Reference Literature 2 or the like may be used, as in the first embodiment. Note that a word region is such a partial region of a feature region that includes a word as a result of the text recognition.

Next, for each word region obtained in the step S703, the feature region extraction unit 101 outputs a rectangular image representation (D dimensions) of the word region (step S704). The rectangular image representation may be output by using a similar scheme that is used when a rectangular image representation of a feature region is obtained in the step S702. Thus, each word region has the location information including the upper-left coordinates and the lower-right coordinates of the word region (a total of four dimensions), the word obtained through the text recognition, and the rectangular image representation (D dimensions) of the word region.

Next, the text analysis unit 103 divides the word region sequence obtained in the step S704 into a sequence of subword tokens (step S705). Hereinafter, a sequence of subword tokens obtained by dividing a word region sequence obtained from a k-th feature region is represented as follows.

$$(x_1^k, x_2^k, \ldots, x_{L^k}^k) \quad \text{[Math. 7]}$$

$L^k$ is the number of subword tokens included in the k-th feature region. For such division, for example, Byte-level BPE described in the above-mentioned Reference Literature 3 or the like may be used, as in the first embodiment. However, instead of subword tokens, for example, a sequence of words separated by a blank or the like may be used, as in the first embodiment.

Note that when a word included in one word region is divided into a plurality of subwords, a word region of each subword is assumed to be the same as the word region of the word before divided.

Next, the text analysis unit 103 divides a question text included in the read training data into a sequence of subword tokens ($x_1^q, x_2^q, \ldots, x_J^q$) (step S706). J is the number of subword tokens of the question text.

Figure 12:
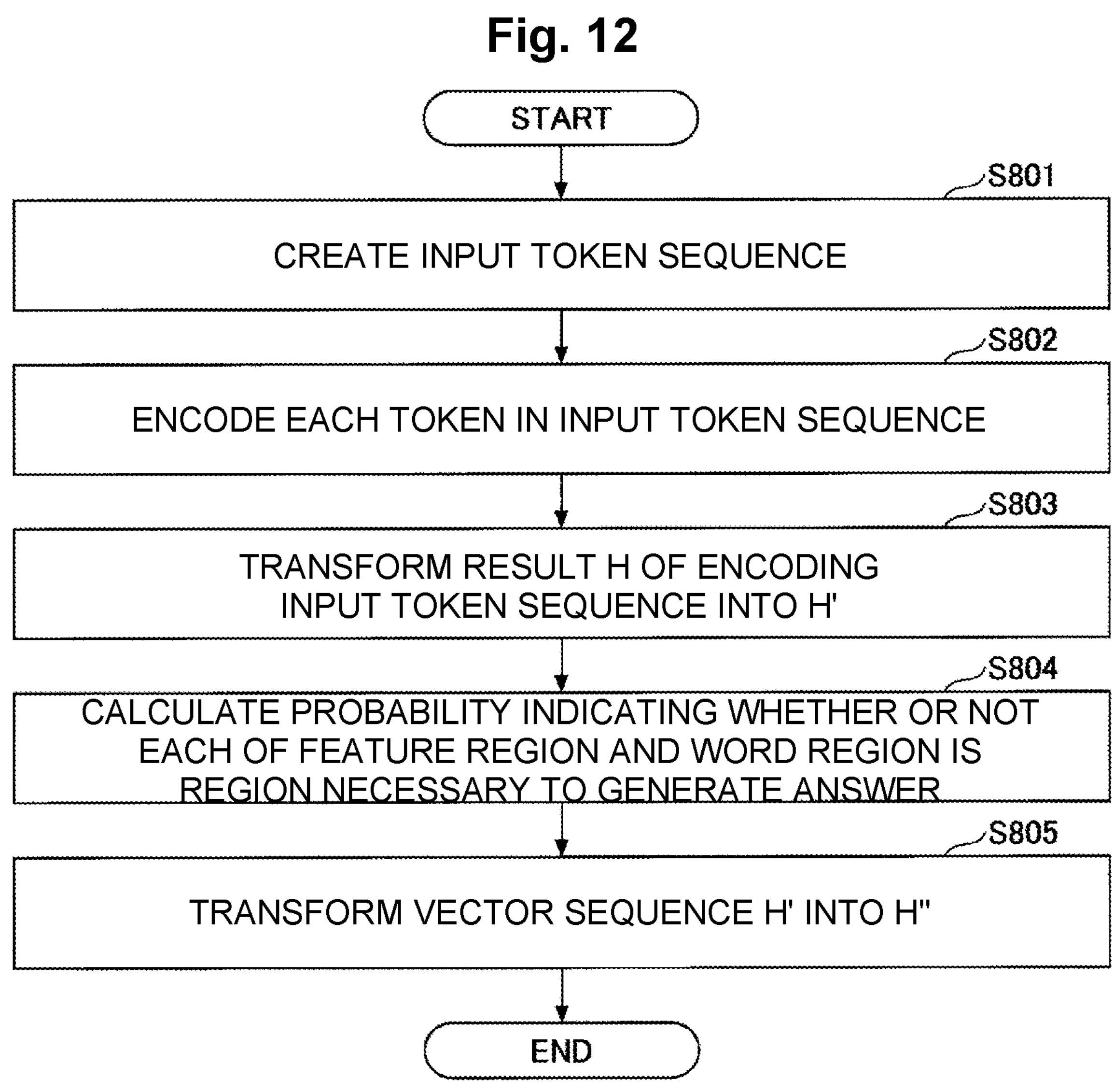
FIG. 12 is a flowchart showing an example of language-with-visual-effect understanding processing according to the second embodiment.

Next, the question answering device 10 performs language-with-visual-effect understanding processing and obtains an encoded sequence that takes visual information into consideration (step S707). Here, details of the language-with-visual-effect understanding processing will be described with reference to FIG. 12. FIG. 12 is a flowchart showing an example of the language-with-visual-effect understanding processing according to the second embodiment.

First, the language-with-visual-effect understanding unit 104, by using the sequences of subword tokens of the word region sequences, and the sequence of subword tokens of the question text, creates an input token sequence as follows (step S801).

$$[CLS], x_1^q, x_2^q, \ldots, x_J^q [SEP], i^1, x_1^1, x_2^1, \ldots, x_{L^1}^1, i^2, x_1^2, x_2^2, \ldots, x_{L^2}^2, i^K, x_1^K, x_2^K, \ldots, x_{L^K}^K, [EOS] \quad \text{[Math. 8]}$$

Here, in the present embodiment, it is assumed that $i^k$ denotes a special token that is treated as a type of subword token, and that is a token according to a region type of a k-th feature region. For example, it is assumed that $i^k$ is [I] when the region type of the k-th feature region is "Image", [D] when "Data (Diagram)", [P/B] when "Paragraph/Body", [S] when "Sub-data", [H/T] when "Heading/Title", [C] when "Caption", [S/B] when "Subtitle/Writer", [L] when "List", and [O] when "Other Text". Hereinafter, $i^k$ is also referred to as a region token, $x_j^q$ is also referred to as a question token, and $x_j^k$ is also referred to as a document token.

Note that when no text is included in a k-th feature region, the sequence of subword tokens of the word region sequence obtained from the k-th feature region has a length of zero (that is, $L^k=0$).

Hereinafter, as in the first embodiment, it is assumed that the length of the input token sequence is L. If the length of the input token sequence exceeds L, the length L of the input token sequence is made to be a predetermined length, such as by deleting the longest text of texts included in the feature regions or by subjecting each text to equal deletion. In contrast, when the length L of the input token sequence is short of the predetermined length, padding may be performed with a special token.

Next, the language-with-visual-effect understanding unit 104 encodes each token (subword token) in the input token sequence (step S802). Here, in the present embodiment, it is assumed that the language-with-visual-effect understanding unit 104 encodes each token x as follows.

$$h = \text{LayerNorm}(\text{TokenEmb}(x) + \text{PositionEmb}(x) + \text{SegmentEmb}(x) + \text{ROIEmb}(x) + \text{LocationEmb}(x))$$

TokenEmb is processing in which the subword token (including a special token) is transformed into a corresponding G-dimensional vector. In the present embodiment, it is assumed that an embedding vector (G=1024) pre-learned as in the above-mentioned Reference Literature 5 is used for initial values, and for model parameters to be learned, as in the first embodiment. Note that parameters of a language model pre-trained by a scheme other than that of Reference Literature 5 may be model parameters to be learned. However, an unlearned special token is initialized by using a random number according to a normal distribution N (0, 0.02).

PositionEmb is processing in which the subword token is transformed into a G-dimensional vector, depending on a position of the subword token in the input token sequence. In the present embodiment, it is assumed that an embedding vector (G=1024) learned as in the above-mentioned Reference Literature 5 is used for initial values, and for model parameters to be learned. However, transformation into the G-dimensional vector may be performed by using the scheme described in the above-mentioned Reference Literature 6, as in the first embodiment.

SegmentEmb is processing in which the subword token is transformed into a G-dimensional vector, depending on a segment to which the subword token belongs. In the present embodiment, for segments, a total of 10 types including the nine region types and a question are used. After an embedding vector (G=1024) is prepared for each segment, the embedding vector is initialized by using a random number according to a normal distribution N (0, 0.02), and is used for model parameters to be learned.

ROIEmb is processing in which a rectangular image representation corresponding to the subword token is transformed into a G-dimensional vector. The rectangular image representation is a D-dimensional vector obtained by inputting a certain rectangular region in an input image into the neural network implementing the feature region extraction unit 101. The rectangular image representation is the rectangular image representation of a k-th feature region when the subword token is a region token $i^k$, and is the rectangular image representation of an i-th word region obtained from a k-th feature region when the subword token is a document token $x_j^k$. When the subword token is a document token $x_j^k$, an output of ROIEmb is assumed to be a G-dimensional zero vector. In the present embodiment, it is assumed that D=2048, and that ROIEmb is to perform transformation into a G-dimensional (G=1024) vector through a feed forward network including a fully connected layer. In the present embodiment, it is assumed that the feed forward network includes one fully connected layer, that parameters thereof are initialized by using a random number according to a normal distribution N (0, 0.02), and that the parameters are model parameters to be learned.

LocationEmb is processing in which the location information of a region (feature region or word region) corresponding to the subword token (which, however, is either a region token or a document token) is transformed from four dimensions into a G-dimensional (G=1024) vector through a feed forward network including a fully connected layer. In LocationEmb, the location information of the region is input into the feed forward network after being normalized by dividing an x coordinate of the location information of the region by a width of the input image, and dividing a y coordinate of the location information of the region by a height of the image. In the present embodiment, it is assumed that the feed forward network includes one fully connected layer, that parameters thereof are initialized by using a random number according to a normal distribution N (0, 0.02), and that the parameters are model parameters to be learned. Note that when the subword token is any other token than a region token or a document token, an output of LocationEmb is assumed to be a G-dimensional zero vector.

As in the first embodiment, LayerNorm takes G-dimensional vectors as inputs, and outputs a G-dimensional vector by using the normalization scheme described in the above-mentioned Reference Literature 7.

Thus, an encoded sequence $H=(h_1, h_2, \ldots, h_L)$ is obtained, where an r-th subword token encoded in the input token sequence is denoted by $h_r$. Note that H is a vector sequence because each $h_r$ is a G-dimensional vector.

Next, the language-with-visual-effect understanding unit 104 transforms the encoded sequence H obtained in the step S802 into a vector sequence H', by using TransformerEncoder with M layers (step S803). In other words, the language-with-visual-effect understanding unit 104 implements H'=TransformerEncoder(H). For TransformerEncoder, for example, the above-mentioned Reference Literature 5 or the like can be referenced. In the present embodiment, it is assumed that M=12, that TransformerEncoder trained as in the above-mentioned Reference Literature 5 is used for initial values, and that parameters of the TransformerEncoder are model parameters to be learned.

Next, the related feature region determination unit 108 calculates a probability indicating whether or not the feature region is a region necessary to generate an answer (step S804). In other words, assuming that an element of H' corresponding to a subword token x (which, however, is either a region token or a document token) in the input token sequence is denoted by h', the related feature region determination unit 108 calculates a probability that the feature region corresponding to the subword token x is necessary for a correct answer, as follows.

$$p=\mathrm{sigmoid}(w_1^{\tau}h'+b_1)$$

Here, $w_1 \in R^G$, $b_1 \in R$ are model parameters to be learned, and $\tau$ indicates transposition.

Next, the related feature region determination unit 108 transforms the vector sequence H' into a vector sequence H", by using the probabilities obtained in the step S804 (step S805). In other words, the related feature region determination unit 108 transforms the vector sequence H' into the vector sequence H" as $h_r''=h_r'a_r$. Here, $h_r''$ denotes an r-th element of the vector sequence H", and $h_r'$ denotes an r-th element of the vector sequence H'. Moreover, $a_r$ is a weight, and a value thereof is assumed to be $p_k$ when the r-th subword token in the input token sequence is a region token $i^k$ or a document token $x_j^k$, and to be 1.0 otherwise. Note that $p_k$ is the probability calculated for the region token $i^k$ in the step S804.

Figure 13:
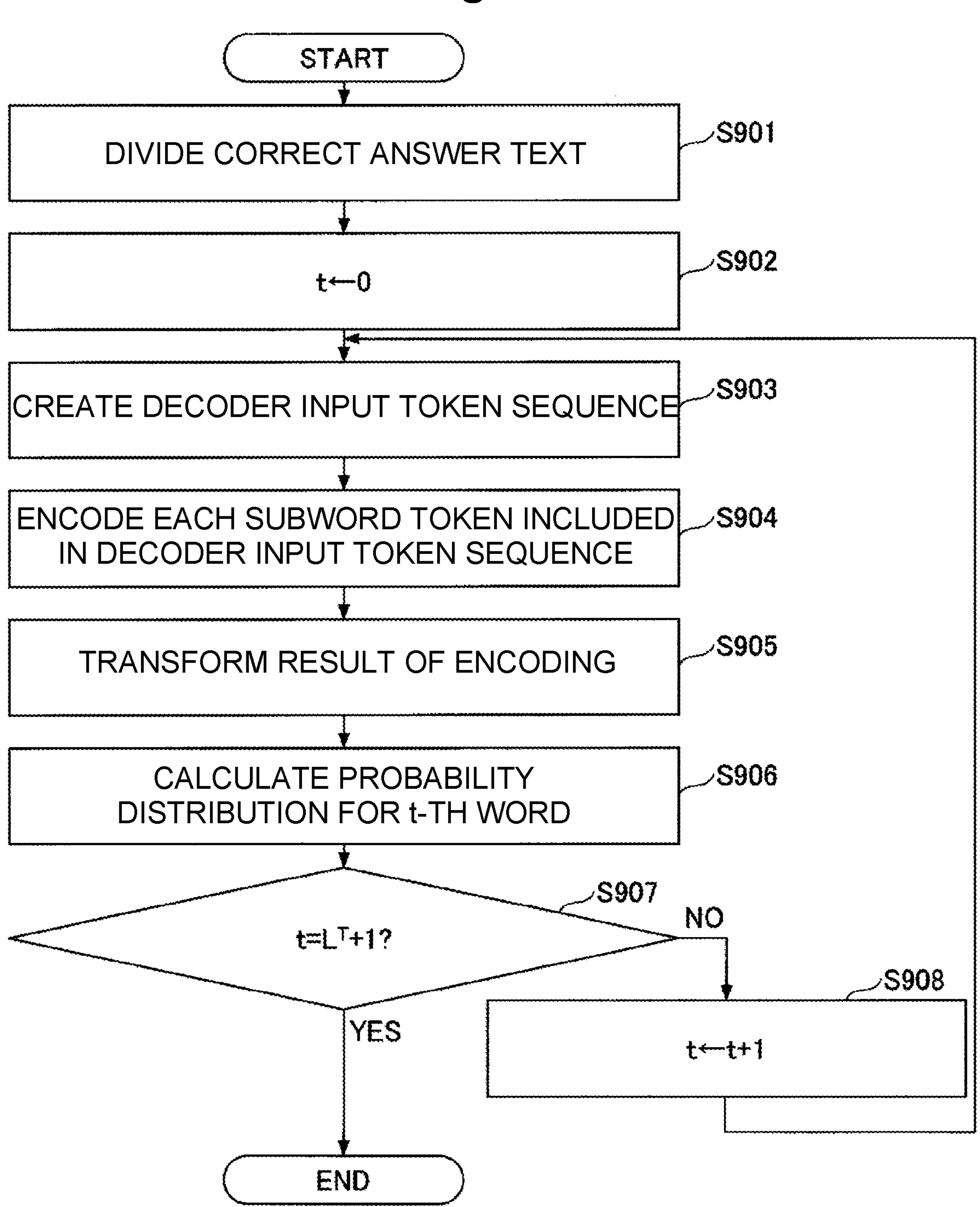
FIG. 13 is a flowchart showing an example of answer text generation probability calculation processing according to the second embodiment.

Referring back to FIG. 11. Subsequent to step S707, the question answering device 10 performs answer text generation probability calculation processing and calculates a probability distribution representing the probability that an answer text is generated (step S708). Here, details of the answer text generation probability calculation processing will be described with reference to FIG. 13. FIG. 13 is a flowchart showing an example of the answer text generation probability calculation processing according to the second embodiment.

First, as in step S401 in FIG. 6, the text analysis unit 103 divides a correct answer text included in the read training data into a sequence of correct answer tokens represented as follows (step S901).

$$(y_1^*, y_2^*, \ldots, y_{L^T}^*) \quad \text{[Math. 9]}$$

$L^T$ is the number of tokens in the sequence of correct answer tokens and is a predetermined value (accordingly, the sequence of correct answer tokens has been subjected to padding, token deletion, or the like as necessary such that the number of tokens becomes $L^T$). Note that the sequence of correct answer tokens is a sequence of subword tokens.

Next, assuming that an index indicating the number of iterations is denoted by t, the language-with-visual-effect understanding unit 104 initializes t to zero (step S902). In the following, the processing during a t-th iteration will be described.

The language-with-visual-effect understanding unit 104 creates a decoder input token sequence $y_{<t}$ as follows (step S903).

$$y_{<t}=([CLS], y_1^*, \ldots, y_{t-1}^*)=(y_0, y_1, \ldots, y_{t-1})$$

However, it is assumed that $y_{<t}$=([CLS]) when t=0. Moreover, it is assumed that $y_t$=[EOS] when $t=L^T+1$, which is a final step.

Next, the language-with-visual-effect understanding unit 104 encodes each subword token y included in the decoder input token sequence $y_{<t}$ as follows (step S904).

$$h^y=\mathrm{LayerNorm}(\mathrm{TokenEmb}(y)+\mathrm{PositionEmb}(y))$$

Thus, an encoded sequence $H^y=(h_0^y, h_1^y, \ldots, h_{t-1}^y)$ is obtained, where a subword token $y_t$ encoded is denoted by $h_t^y$.

Next, the language-with-visual-effect understanding unit 104 transforms the encoded sequence $H^y$ obtained in the step S904 into $H^{y}{}''$, by using TransformerDecoder with M layers (step S905). In other words, the language-with-visual-effect understanding unit 104 implements $H^{y}{}''$=TransformerDecoder($H^y$, H"). Thus, $H^{y}{}''=(h_0^{y}{}'', h_1^{y}{}'', \ldots h_{t-1}^{y}{}'')$ is obtained.

Note that for TransformerDecoder, for example, the above-mentioned Reference Literature 5 or the like can be referenced. In the present embodiment, it is assumed that M=12, that TransformerDecoder trained as in the above-mentioned Reference Literature 5 is used for initial values, and that parameters of the TransformerDecoder are model parameters to be learned. Note that parameters of a language model pre-trained by a scheme other than that of Reference Literature 5 may be model parameters to be learned.

Next, the answer text generation unit 105 calculates $p(y_t|y_{<t})$, a distribution of the probability that a t-th word is generated (step S906). A probability distribution for a word $y_t$ in a preset output vocabulary (V words) is calculated as $p(y_t|y_{<t})=\mathrm{softmax}(Wh_{t-1}^{y}{}''+b)$. Here, $W \in R^{V \times G}$, $b \in R^V$ are model parameters to be learned. For the number V of words, for example, 50257 or the like is conceivable, although an any value may be set.

Next, the language-with-visual-effect understanding unit 104 determines whether or not $t=L^T+1$ (step S907).

When it is not determined in the step S907 that $t=L^T+1$, the language-with-visual-effect understanding unit 104 adds one to t (step S908), and returns to step S903. Thus, the steps S903 to S906 are iteratively performed for $t=0, 1, \ldots, L^T+1$.

Referring back to FIG. 11. Subsequent to step S708, the parameter learning unit 106 calculates a loss "Loss", by using the probability distribution $p(y_t|y_{<t})$ calculated in step S906 in FIG. 13 and a set of correct feature regions included in the read training data (step S709). The parameter learning unit 106 may calculate the loss "Loss", for example, as follows.

[Math. 10]

$$\text{Loss} = -\frac{1}{T}\sum_{t}^{T}\ln(p(y_t^*\mid y_{<t}^*)) - \frac{\lambda}{K}\sum_{k}^{K}\{r_k^*\ln(p_k) - (1-r_k^*)\ln(1-p_k)\}$$

T is an actual length of the sequence of correct answer tokens (that is, a length before padding or the like is performed), and $r_k$* is a value with which the set of correct feature regions is determined, and is 1 when a k-th feature region is necessary for a correct answer, and is 0 otherwise. λ is a hyperparameter, and λ=1.0 in the present embodiment.

Since subsequent steps S710 to S712 are similar to steps S209 to S211 in FIG. 3, a description thereof is omitted.

As described above, in the question answering device 10 according to the present embodiment, when an image including text, a question text related to the image, and a set of correct feature regions are given, the model parameters are learned such that an answer text that takes visual information in the image into consideration is generated. In other words, the model parameters are learned such that machine reading comprehension that takes visual information into consideration can be achieved.

[Inference Time]

Next, a description will be given regarding inference time. Test data including an image including text and a question text related to the image is input into a question answering device 10 in the inference time.

<Overall Configuration of Question Answering Device 10 in Inference Time>

An overall configuration of the question answering device 10 in the inference time will be described with reference to FIG. 14. FIG. 14 shows an example of the overall configuration of the question answering device 10 (in the inference time) according to the second embodiment.

As shown in FIG. 14, the question answering device 10 in the inference time includes a feature region extraction unit 101, a text recognition unit 102, a text analysis unit 103, a language-with-visual-effect understanding unit 104, an answer text generation unit 105, a related feature region determination unit 108, and a parameter storage unit 107. Of the units, the feature region extraction unit 101, the text recognition unit 102, and the text analysis unit 103 are similar to those in the learning time. On the other hand, the language-with-visual-effect understanding unit 104, the answer text generation unit 105, and the related feature region determination unit 108 use the learned model parameters stored in the parameter storage unit 107. Moreover, the answer text generation unit 105 generates an answer text by using a probability distribution calculated from an encoded sequence obtained by the language-with-visual-effect understanding unit 104. The related feature region determination unit 108 may output a score (related feature region score) calculated or determined based on a probability indicating whether or not a feature region extracted by the feature region extraction unit 101 is information necessary to answer a question.

<Inference Processing>

Figure 15:
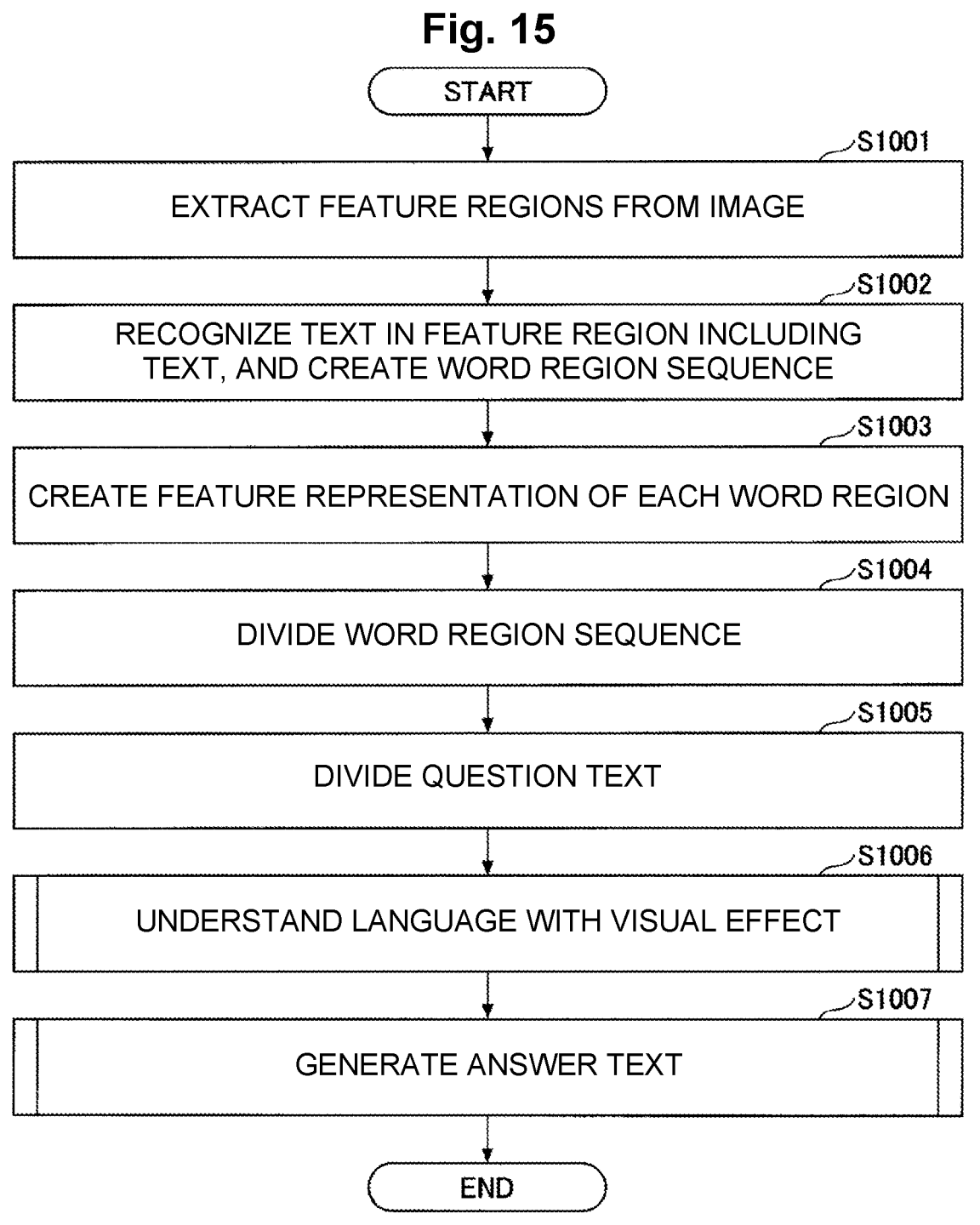

Next, inference processing according to the present embodiment will be described with reference to FIG. 15. FIG. 15 is a flowchart showing an example of the inference processing according to the second embodiment. Hereinafter, it is assumed that the test data given to the question answering device 10 is already read.

First, as in step S702 in FIG. 11, the feature region extraction unit 101 extracts K feature regions from the image included in the read test data (step S1001).

Next, as in step S703 in FIG. 11, the text recognition unit 102 performs text recognition on a feature region of a region type indicating that the feature region includes text, among the feature regions extracted in the step S1001, and outputs a sequence of word regions (step S1002).

Next, as in step S704 in FIG. 11, the feature region extraction unit 101, for each word region obtained in the step S1002, outputs a rectangular image representation (D dimensions) of the word region (step S1003). Thus, the sequence of word regions, each of which has location information including upper-left coordinates and lower-right coordinates (a total of 4 dimensions), a word obtained through the text recognition, and the rectangular image representation (D dimensions), is obtained.

Next, as in step S705 in FIG. 11, the text analysis unit 103 divides the sequence of word regions obtained in the step S1003 into a sequence of subword tokens (step S1004).

Next, as in step S706 in FIG. 11, the text analysis unit 103 divides the question text included in the read test data into a sequence of subword tokens $(x_1^q, x_2^q, \ldots, x_J^q)$ (step S1005).

Next, the question answering device 10 performs language-with-visual-effect understanding processing and obtains an encoded sequence that takes visual information into consideration (step S1006). Since the language-with-visual-effect understanding processing is similar to step S707 in FIG. 11, a description thereof is omitted. Hereinafter, the description will be continued, assuming that a vector sequence H" has been obtained.

Figure 16:
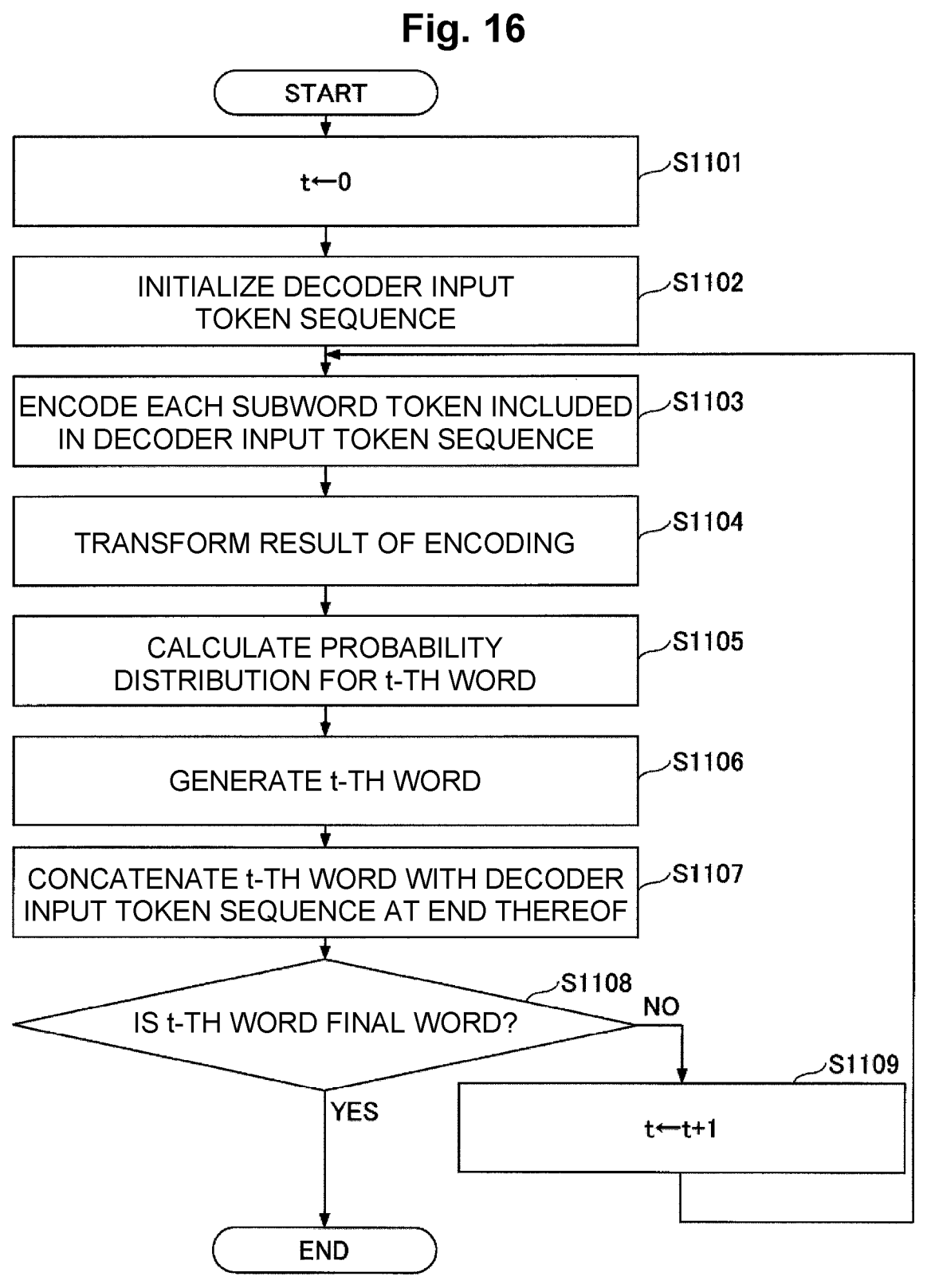

Next, the question answering device 10 performs answer text generation processing and generates an answer text (step S1007). Here, details of the answer text generation processing will be described with reference to FIG. 16. FIG. 16 is a flowchart showing an example of the answer text generation processing according to the second embodiment.

First, assuming that an index indicating the number of iterations is denoted by t, the language-with-visual-effect understanding unit 104 initializes t to zero (step S1101). In the following, the processing during a t-th iteration will be described.

The language-with-visual-effect understanding unit 104 initializes a decoder input token sequence as $y_{<t}$=([CLS]) (step S1102). In other words, the language-with-visual-effect understanding unit 104 makes the decoder input token sequence $y_{<t}$ at a time of t=0 include only [CLS].

In the following, the processing during a t-th iteration will be described.

As in step S904 in FIG. 13, the language-with-visual-effect understanding unit 104 encodes each subword token y included in the decoder input token sequence $y_{<t}$ as follows (step S1103).

$$h^y = \text{LayerNorm}(\text{TokenEmb}(y) + \text{PositionEmb}(y))$$

Thus, an encoded sequence $H^y=(h_0^y, h_1^y, \ldots, h_{t-1}^y)$ is obtained, where a subword token $y_t$ encoded is denoted by $h_t^y$.

Next, as in step S905 in FIG. 13, the language-with-visual-effect understanding unit 104 transforms the encoded sequence $H^y$ obtained in the step S1103 into $H^{y}$", by using TransformerDecoder with M layers (step S1104). In other words, the language-with-visual-effect understanding unit 104 implements $H^{y'}$=TransformerDecoder($H^{y}$, H"). Thus, $H^{y'}=(h_0^{y'}, h_1^{y'}, \ldots, h_{t-1}^{y'})$ is obtained.

Next, as in step S906 in FIG. 13, the answer text generation unit 105 calculates $p(y_t|y_{<t})$, a distribution of the probability that a t-th word is generated (step S1105). A probability distribution for a word $y_t$ in a preset output vocabulary (V words) is calculated as $p(y_t|y_{<t})$=softmax $(Wh_{t-1}^{y'}+b)$. Here, $W \in R^{V \times G}$, $b \in R^{V}$ are the learned model parameters.

Next, the answer text generation unit 105 generates the t-th word, based on the probability distribution $p(y_t|y_{<t})$ calculated in the step S1105 (step S1106). The answer text generation unit 105 may generate a word with a maximum probability as the t-th word, or may generate the t-th word by sampling according to the probability distribution.

Next, the answer text generation unit 105 concatenates the t-th word generated in the step S1106 with the decoder input token sequence $y_{<t}$ at an end thereof (step S1107).

Next, the language-with-visual-effect understanding unit 104 determines whether or not the t-th word generated in the step S1106 is a final word (step S1108).

When it is not determined in the step S1108 that the t-th word is a final word, the language-with-visual-effect understanding unit 104 adds one to t (step S1109), and returns to step S1103. Thus, the steps S1103 to S1107 are iteratively performed, and a sequence of words is obtained.

As described above, in the question answering device 10 according to the present embodiment, when an image including text and a question text related to the image are given, an answer text (a sequence of words) that takes visual information in the image into consideration can be generated.

[Evaluation of the Present Embodiment]

Next, a description will be given of evaluation of the fact that it is taken into consideration whether or not a feature region is information necessary to answer a question.

To evaluate the present embodiment, performance comparison with a baseline was performed. For the models in the present embodiment, a model that uses BART described in the above-mentioned Reference Literature 5 for a pre-trained model, and a model that uses T5 described in Reference Literature 8 "Raffel, C.; Shazeer, N.; Roberts, A.; Lee, K.; Narang, S.; Matena, M.; Zhou, Y.; Li, W.; and Liu, P. J. 2020. Exploring the Limits of Transfer Learning with a Unified Text-to-Text Transformer. J. Mach. Learn. Res. 21(140): 1-67." for a pre-rained model, were used. Hereinafter, the model using BART will be referred to as "LayoutBART", and the model using T5 will be referred to as "LayoutT5". Moreover, the models that use LARGE for BERT, in particular, will be denoted by "LayoutBART$_{LARGE}$" and "LayoutT5$_{LARGE}$" respectively.

For the baseline, a model called M4C described in Reference Literature 9 "Hu, R.; Singh, A.; Darrell, T.; and Rohrbach, M. 2020. Iterative Answer Prediction with Pointer-Augmented Multi-modal Transformers for TextVQA. In CVPR, 9992-10002." was adopted. M4C is a model that takes a question text, a feature region, and a token that is an OCR token (corresponding to a document token in the present embodiment) as inputs, and generates an answer to the question text, and it has been confirmed that the model can achieve high performance.

For evaluation metrics, five metrics, BLEU, METEOR, ROUGE-L, CIDEr, and BERTscore, were used. After the models were trained by using a prepared training dataset for experiment, the four evaluation metrics were calculated by using test data. Results of the calculation are shown in the following Table 1.

TABLE 1

| Model | BLEU-1 | BLEU-2 | BLEU-3 | BLEU-4 | METEOR | ROUGE-L | CIDEr | BERTscore |
|---|---|---|---|---|---|---|---|---|
| M4C | 29.2 | 20.1 | 14.4 | 10.3 | 12.8 | 28.1 | 98.6 | 86.1 |
| LayoutT5 | 56.0 | 50.8 | 46.7 | 43.4 | 34.6 | 54.6 | 335.9 | 90.8 |
| LayoutBART | 53.0 | 46.8 | 42.3 | 38.7 | 31.9 | 52.8 | 309.9 | 90.7 |
| LayoutT5$_{LARGE}$ | 57.2 | 52.1 | 48.1 | 44.9 | 37.3 | 57.1 | 364.2 | 91.3 |
| LayoutBART$_{LARGE}$ | 57.2 | 51.2 | 46.7 | 43.0 | 36.1 | 57.0 | 346.0 | 91.5 |

As shown in Table 1 above, it can be seen that LayoutBART and LayoutT5 achieve higher performance than M4C for all of the evaluation metrics. Moreover, as shown in Table 1 above, it can also be seen that use of LARGE for BERT can achieve higher performance than use of BASE. As described above, it can be understood that when an image including text and a question text are given, the scheme of the present embodiment can achieve higher performance than a conventional scheme, in a task of generating an answer text to the question text.

<Hardware Configuration>

Figure 17:
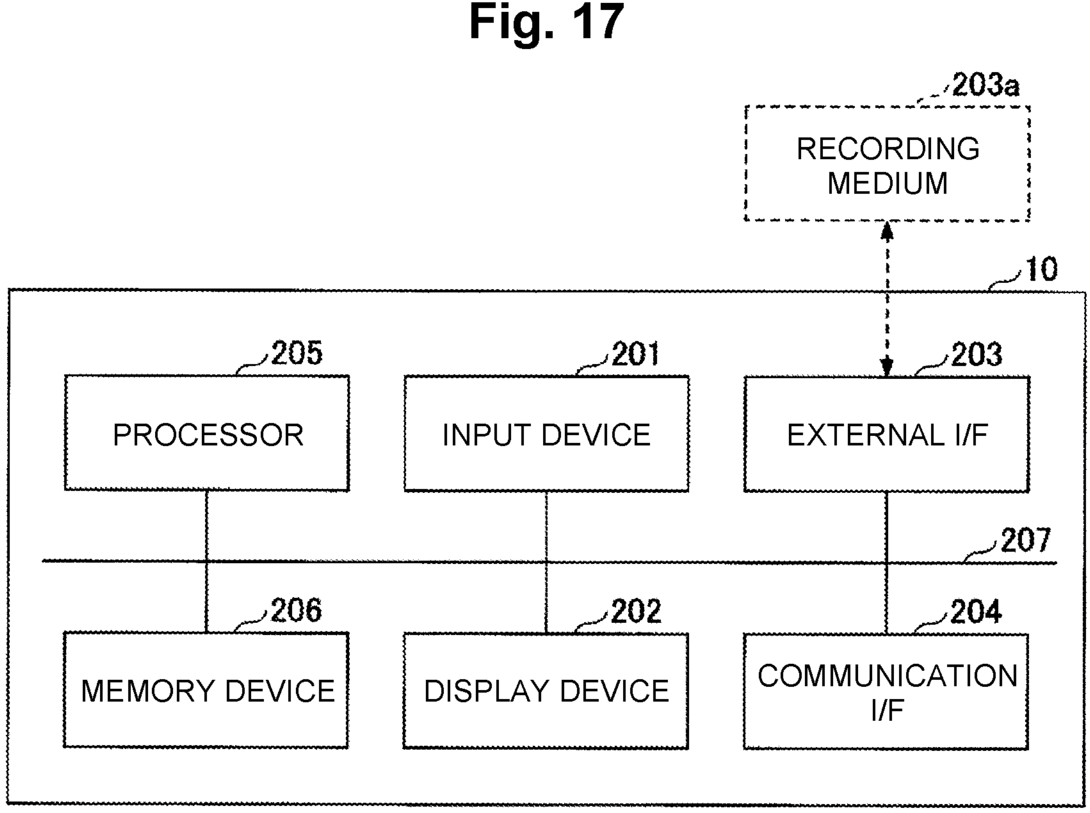
FIG. 17 shows an example of a hardware configuration of a question answering device according to an embodiment.

Lastly, a hardware configuration of the question answering devices 10 according to the first and second embodiments will be described with reference to FIG. 17. FIG. 17 shows an example of the hardware configuration of the question answering device 10 according to an embodiment.

As shown in FIG. 17, the question answering device 10 according to an embodiment is implemented by a general computer or computer system, and includes an input device 201, a display device 202, an external I/F 203, a communication I/F 204, a processor 205, and a memory device 206. Each of the hardware components are communicably connected to each other through a bus 207.

The input device 201 is, for example, a keyboard, a mouse, a touch panel, or the like. The display device 202 is, for example, a display or the like. Note that the question answering device 10 does not need to include at least one of the input device 201 and the display device 202.

The external I/F 203 is an interface with an external device. External devices include a recording medium 203*a* and the like. The question answering device 10 can perform reading, writing, and the like of the recording medium 203*a* via the external I/F 203. The recording medium 203*a* may store one or more programs that implement each functional unit (the feature region extraction unit 101, the text recognition unit 102, the text analysis unit 103, the language-with-visual-effect understanding unit 104, the answer text generation unit 105, the parameter learning unit 106, and the related feature region determination unit 108) included in the question answering device 10.

Note that examples of the recording medium 203*a* include a CD (Compact Disc), a DVD (Digital Versatile Disk), an SD memory card (Secure Digital memory card), a USB (Universal Serial Bus) memory card, and the like.

The communication I/F 204 is an interface for allowing the question answering device 10 to connect to a communication network. Note that the one or more programs that implement each functional unit included in the question answering device 10 may be acquired (downloaded) from a predetermined server device or the like via the communication I/F 204.

The processor 205 is, for example, any of various types of arithmetic logic devices such as a CPU (Central Processing Unit) and a GPU (Graphics Processing Unit). Each functional unit included in the question answering device 10 is implemented, for example, through processing that the one or more programs stored in the memory device 206 causes the processor 205 to execute.

The memory device 206 is, for example, any of various types of storage devices such as an HDD (Hard Disk Drive), an SSD (Solid State Drive), a RAM (Random Access Memory), a ROM (Read Only Memory), a flash memory, and the like. For example, the parameter storage unit 107 included in the question answering device 10 can be implemented by using the memory device 206. Note that the parameter storage unit 107 may be implemented by using a storage device (for example, a database server or the like) connected to the question answering device 10 via the communication network.

The question answering devices 10 according to the first and second embodiments have the hardware configuration shown in FIG. 17, and thereby can implement the learning processing and the inference processing described above. Note that the hardware configuration shown in FIG. 17 is an example, and the question answering devices 10 may have another hardware configuration. For example, the question answering devices 10 may include a plurality of processors 205, or may include a plurality of memory devices 206.

Regarding the above-described embodiments, supplements as follows are further disclosed.

(Supplement 1)

A learning device including: a memory; and at least one processor connected to the memory, wherein the processor takes data including text, and a question text related to the data as inputs, creates, by using a model parameter of a neural network, a token sequence that takes visual information in the data into consideration, generates an answer text to the question text, based on the created token sequence, and learns the model parameter by using the answer text and a correct answer text to the question text.

(Supplement 2)

The learning device according to Supplement 1, wherein the processor extracts a region based on a visual feature from the data, and creates the token sequence, based on the question text, text included in the region, and information related to the region.

(Supplement 3)

The learning device according to Supplement 2, wherein the processor calculates a probability that the region is necessary to generate the answer text, generates the answer text, based on a sequence obtained by transforming the token sequence by using the calculated probability, and learns the model parameter by using the calculated probability and a loss from correct information indicating whether or not the region is necessary to generate the answer text.

(Supplement 4)

A text generation device including: a memory; and at least one processor connected to the memory, wherein the processor takes data including text, and a question text related to the data as inputs, creates, by using a learned model parameter of a neural network, a token sequence that takes visual information in the data into consideration, and generates an answer text to the question text, based on the created token sequence.

(Supplement 5)

The text generation device according to Supplement 4, wherein the processor extracts a region based on a visual feature from the data, and creates the token sequence, based on the question text, text included in the region, and information related to the region.

(Supplement 6)

The text generation device according to Supplement 5, wherein the information related to the region includes information indicating a location of the region in the data, and information representing a feature of the region.

(Supplement 7)

The text generation device according to Supplement 5 or 6, wherein the processor a probability that the region is necessary to generate the answer text, and generates the answer text, based on a sequence obtained by transforming the token sequence by using the calculated probability.

(Supplement 8)

A non-transitory storage medium storing a program that is executable by a computer such that learning processing is performed, wherein the learning processing includes: taking data including text, and a question text related to the data as inputs, creating, by using a model parameter of a neural network, a token sequence that takes visual information in the data into consideration, and generating an answer text to the question text, based on the created token sequence; and learning the model parameter by using the answer text and a correct answer text to the question text.

(Supplement 9)

A non-transitory storage medium storing a program that is executable by a computer such that text generation processing is performed, wherein the text generation processing includes taking data including text, and a question text related to the data as inputs, creating, by using a learned model parameter of a neural network, a token sequence that takes visual information in the data into consideration, and generating an answer text to the question text, based on the created token sequence.

The present invention is not limited to the above-described embodiments that are specifically disclosed, but various modifications, changes, combinations with known technologies, and the like can be made without departing from the scope of claims.

The present application is based upon its basic application PCT/JP2020/008390, filed on Feb. 28, 2020 in Japan, the content of which is incorporated herein in its entirety by reference.

REFERENCE SIGNS LIST

10 Question answering device
101 Feature region extraction unit
102 Text recognition unit
103 Text analysis unit
104 Language-with-visual-effect understanding unit
105 Answer text generation unit
106 Parameter learning unit
107 Parameter storage unit
108 Related feature region determination unit

The invention claimed is:

1. A learning apparatus, comprising:

a memory; and a processor configured to execute:

receiving, as inputs, image data of an image and a question text related to the image data, wherein the image depicts a rendered text in a region of the image, the image data comprises visual content and the rendered text as a part of the visual content, and the rendered text comprises at least a part of a word and visual information of the at least the part of the word;

creating a token sequence comprising query token sequence and image data token sequence, wherein the query token sequence corresponds to the question text, and the image data token sequence is generated from both a text token and an image token, the text token is generated based at least on automatically recognizing the rendered text in the region of the image, the image token is generated based at least on image features of the visual content in the region of the image, and the creating the token sequence further comprises encoding the text token according to the visual information in the region of the image by performing language-with-visual-effect understanding operations;

generating, as output, an answer text to the question text, based on the created token sequence and a model parameter, thereby the answer text is according to at least the visual information effect of the rendered text; and learning the model parameter by using the answer text and a correct answer text to the question text.

2. The learning apparatus according to claim 1, wherein, the visual information comprises at least either one of a location of the rendered text in the image data or a size of the rendered text, and wherein the processor is configured to further execute: extracting a region based on a visual feature from the image data, and creating the token sequence, based on the question text, text included in the region, and information related to the region.

3. The learning apparatus according to claim 2, wherein the processor is further configured to execute calculating a probability that the region is necessary to generate the answer text, wherein the generating further comprises generating the answer text, based on a sequence obtained by transforming the token sequence by using the probability calculated by the calculating, and the learning learns the model parameter by using the probability calculated by the calculating, and a loss from correct information indicating whether or not the region is necessary to generate the answer text.

4. The learning apparatus according to claim 1, the processor configured to further execute:

extracting a plurality of regions from the image data; and for each region in the plurality of regions:

generating one or more text tokens from text in a region of the plurality of regions; and generating image token from visual feature of the region of the plurality of regions.

5. The learning apparatus according to claim 4, wherein the text is obtained by performing an optical character recognition of the region of the plurality of regions.

6. The learning apparatus according to claim 4, wherein the plurality of regions is extracted based on visual features of the visual content.

7. The learning apparatus according to claim 4, wherein the plurality of regions comprises text-containing regions and non-text regions.

8. The learning apparatus according to claim 4, wherein image data tokens in the image data token sequence comprise visual feature values.

9. The learning apparatus according to claim 1, wherein the image data comprises an integrated visual content in which text and non-text elements coexist within a unified visual representation.

10. The learning apparatus according to claim 1, wherein the image data token sequence is generated from both text token corresponding to the text included in the visual content and image token corresponding to the image features of the visual content.

11. The learning apparatus according to claim 1, wherein the processor is further configured to execute:

generating one or more text tokens and one or more image tokens from each of a plurality of extracted regions, wherein the one or more text tokens correspond to the text included in the visual content and the one or more image tokens correspond to the image features of the visual content.

12. The learning apparatus according to claim 1, the processor further configured to execute:

extract one or more regions from the image data; and generate at least either one of the text token or the image token depending on content of the extracted one or more regions.

13. A text generation apparatus, comprising:

a memory; and a processor configured to execute:

receiving, as inputs, image data of an image and a question text related to the image data, wherein the image depicts a rendered text in a region of the image, the image data comprises visual content and the rendered text as a part of the visual content, and the rendered text comprises at least a part of a word and visual information of the at least the part of the word;

creating, by using a learned model parameter of a neural network, a token sequence comprising query token sequence and image data token sequence, wherein the query token sequence corresponds to the question text, the image data token sequence is generated from both a text token and an image token, the text token is generated based at least on automatically recognizing the rendered text in the region of the image, the image token is generated based at least on image features of the visual content in the region of the image, and the creating the token sequence further comprises encoding the text token according to the visual information in the region of the image by performing language-with-visual-effect understanding operations;

generating, as output, an answer text to the question text, based on the created token sequence and the learned model parameter, thereby the answer text is according to at least the visual information effect of the rendered text.

14. The text generation apparatus according to claim 13, wherein, the visual information comprises at least either one of a location of the rendered text in the image data or a size of the rendered text, and wherein the creating extracts a region based on a visual feature from the image data, and creates the token sequence, based on the question text, text included in the region, and information related to the region.

15. The text generation apparatus according to claim 14, wherein the information related to the region includes information indicating a location of the region in the image data, and information representing a feature of the region.

16. The text generation apparatus according to claim 14, wherein the processor is further configured to execute calculating a probability that the region is necessary to generate the answer text, and wherein creating generates the answer text, based on a sequence obtained by transforming the token sequence by using the probability calculated by the calculating.

17. A learning method executed by a computer including a memory; and a processor, the method comprising:

receiving, as inputs, image data of an image and a question text related to the image data, wherein the image depicts a rendered text in a region of the image, the image data comprises visual content and the rendered text as a part of the visual content, and the rendered text comprises at least a part of a word and visual information of the at least the part of the word;

creating, by using a model parameter of a neural network, a token sequence comprising query token sequence and image data token sequence, wherein the query token sequence corresponds to the question text, and the image data token sequence is generated from both a text token and an image token, the text token is generated based at least on automatically recognizing the rendered text in the region of the image, the image token is generated based at least on image features of the visual content in the region of the image, and the creating the token sequence further comprises encoding the text token according to the visual information in the region of the image by performing language-with-visual-effect understanding operations;

generating, as output, an answer text to the question text, based on the created token sequence and the model parameter, thereby the answer text is according to at least the visual information effect of the rendered text; and learning the model parameter by using the answer text and a correct answer text to the question text.

18. The learning method according to claim 17, wherein the image data token sequence is generated from both text token corresponding to the text included in the visual content and image token corresponding to the image features of the visual content.

19. The learning method according to claim 17, wherein, the visual information comprises at least either one of a location of the rendered text in the image data or a size of the rendered text, and wherein the processor is further configured to execute:

generating one or more text tokens and one or more image tokens from each of a plurality of extracted regions, wherein the one or more text tokens correspond to the text included in the visual content and the one or more image tokens correspond to the image features of the visual content.

20. A non-transitory computer-readable recording medium having computer-readable instructions stored thereon, which when executed, cause a computer including a memory and a processor to function as the learning apparatus according to claim 1.

* * * * *